United States Patent
Zhao et al.

(10) Patent No.: US 10,470,019 B2
(45) Date of Patent: Nov. 5, 2019

(54) METHOD, DEVICE, AND SYSTEM FOR ADJUSTING PACKET LENGTH IN NEAR FIELD COMMUNICATION (NFC)

(71) Applicant: HUAWEI TECHNOLOGIES CO., LTD., Shenzhen (CN)

(72) Inventors: Xiaona Zhao, Beijing (CN); Xinmiao Chang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/576,649

(22) PCT Filed: May 26, 2015

(86) PCT No.: PCT/CN2015/079847
§ 371 (c)(1),
(2) Date: Nov. 22, 2017

(87) PCT Pub. No.: WO2016/187821
PCT Pub. Date: Dec. 1, 2016

(65) Prior Publication Data
US 2018/0132089 A1    May 10, 2018

(51) Int. Cl.
*H04W 4/80* (2018.01)
*H04B 5/00* (2006.01)
*H04L 12/805* (2013.01)

(52) U.S. Cl.
CPC .......... *H04W 4/80* (2018.02); *H04B 5/00* (2013.01); *H04B 5/0025* (2013.01); *H04L 47/365* (2013.01); *H04L 2212/00* (2013.01)

(58) Field of Classification Search
CPC ..... H04B 5/00; H04B 5/0025; H04L 2212/00; H04L 47/365; H04W 4/80
See application file for complete search history.

(56) References Cited

U.S. PATENT DOCUMENTS

2006/0052055 A1    3/2006    Rowse et al.
2011/0210820 A1    9/2011    Talty et al.
(Continued)

FOREIGN PATENT DOCUMENTS

CN    101010887 A    8/2007
CN    101675428 A    3/2010
(Continued)

OTHER PUBLICATIONS

Machine Translation and Abstract of Japanese Publication No. JP2015028813, Feb. 12, 2015, 42 pages.
(Continued)

*Primary Examiner* — Kan Yuen
(74) *Attorney, Agent, or Firm* — Conley Rose, P.C.

(57) ABSTRACT

A method, an apparatus, and a system are provided for adjusting a data packet length in near field communication NFC. The method includes: determining, by an NFCC of a first NFC device, whether the NFCC is responsible for determining a maximum length value of data packets transmitted in subsequent communication; if yes, sending a first request comprising a first length value to a second NFC device, the first request further includes a first DID; receiving a first response that is returned by the second NFC device for the first request and that comprises a second DID; and when the first DID is the same as the second DID, using the first length value as the maximum length value of the data packets transmitted in the subsequent communication.

16 Claims, 8 Drawing Sheets

(56) References Cited

U.S. PATENT DOCUMENTS

| | | | | |
|---|---|---|---|---|
| 2012/0329393 A1* | 12/2012 | Hillan | ............... | H04W 4/80 455/41.1 |
| 2014/0215166 A1 | 7/2014 | Gallo et al. | | |
| 2016/0112096 A1 | 4/2016 | Zhao et al. | | |

FOREIGN PATENT DOCUMENTS

| | | |
|---|---|---|
| CN | 102170300 A | 8/2011 |
| CN | 103187998 A | 7/2013 |
| EP | 1845694 A1 | 10/2007 |
| JP | 2014527323 A | 10/2014 |
| JP | 2015028813 A | 2/2015 |
| WO | 2015027801 A1 | 3/2015 |

OTHER PUBLICATIONS

Foreign Communication From A Counterpart Application, Japanese Application No. 2017-561382, Japanese Office Action dated Nov. 27, 2018, 5 pages.

Foreign Communication From A Counterpart Application, Japanese Application No. 2017-561382, English Translation of Japanese Office Action dated Nov. 27, 2018, 6 pages.

"CR_ Poll/ NFC-DEP Parameters & NFC-DEP OP," NCI 2.0-Draft 13, Huawei, Change Request NFC Forum Committee, dated Aug. 18, 2015, 8 pages.

"NFC Forum NFC Controller Interface (NCI) Technical Specification Version 2.0 Draft 14," [NCI] NFC Forum, dated Aug. 27, 2015, 212 pages.

"NFC Forum NFC Digital Protocol Technical Specification Version 1.1," NFC Forum dated Jul. 14, 2014, 204 pages.

International Search Report (including English translation) issued in corresponding International Application No. PCT/CN2015/079847, dated Feb. 25, 2016, 7 pages.

NFC Forum, "NFC Digital Protocol Technical Specification," XP002780618, NFCForum-TS-DigitalProtocol-1.0, Nov. 17, 2010, 194 pages.

NFC Forum, "NFC Controller Interface (NCI) Specification," XP002780619, NFCForum-TS-NCI-1.0, Nov. 6, 2012, 146 pages.

Foreign Communication From A Counterpart Application, European Application No. 15892902.6, Extended European Search Report dated May 14, 2018, 12 pages.

* cited by examiner

METHOD, DEVICE, AND SYSTEM FOR ADJUSTING PACKET LENGTH IN NEAR FIELD COMMUNICATION (NFC)

CROSS-REFERENCE TO RELATED APPLICATIONS

This application is a national stage of International Application No. PCT/CN2015/079847, filed on May 26, 2015, which is hereby incorporated by reference in its entirety.

TECHNICAL FIELD

Embodiments of the present invention relate to the field of near field communication (NFC, Near Field Communication) technologies, and specifically, to a method for adjusting a data packet length in near field communication NFC, an apparatus, and a system.

BACKGROUND

An NFC technology is a short-range wireless connection technology. In the technology, magnetic field induction may be used to implement near field communication between electronic devices (also referred to as "NFC devices") having an NFC function. An NFC device mainly includes three functional entities: a device host (DH, Device Host), an NFC controller (NFCC, NFC Controller), and an NFC execution environment (NFCEE, NFC Execution Environment). In the NFC technology, the NFC controller interface (NCI, NFC Controller Interface) protocol mainly defines a logical interface used to implement communication between the DH and the NFCC of the NFC device, and two NFC devices communicating in a peer-to-peer (P2P, Peer-to-Peer) mode should comply with the Near Field Communication Data Exchange Protocol (NFC-DEP, NFC-Data Exchange Protocol).

The Digital specification (a full name is NFC digital protocol technical specification) formulated by the NFC forum (NFC Forum) stipulates: Before communicating by using the NFC-DEP protocol, the two NFC devices performing peer-to-peer communication negotiate, by using an attribute request (ATR_REQ, Attribute Request) and an attribute response (ATR_RES, Attribute Response), with each other about maximum length values $LR_I$ and $LR_T$ of data packets transmitted in a subsequent communication process. $LR_I$ is set by an NFC device used as an initiator (initiator) and is used to limit a length of a data packet sent by an NFC device used as a target (target), and $LR_T$ is set by the NFC device used as the target and is used to limit a length of a data packet sent by the NFC device used as the initiator. Then, the NFC device used as the initiator and the NFC device used as the target may adjust, by using a parameter selection request (PSL_REQ, Parameter Selection Request), a maximum length value LR of data packets transmitted in the subsequent communication process. LR is less than or equal to $LR_I$ and $LR_T$, that is, LR is a method for negotiating, by two NFC chips, about a length of a communication data packet.

The NCI protocol is used to stipulate how to configure a parameter, a command, and the like that are used when an NFC chip communicates with a peer NFC chip. Certainly, the NCI protocol does not provide a function of guiding an NFC chip how to adjust, by using the PSL_REQ defined in the Digital protocol, the maximum length value LR of the data packets transmitted in the subsequent communication process.

SUMMARY

Embodiments of the present invention disclose a method for adjusting a data packet length in near field communication NFC, an apparatus, and a system, to implement, by means of the NCI specification, a function that an NFCC of a first NFC device used as an initiator and a second NFC device used as a target adjust a maximum length value of data packets transmitted in a subsequent communication process.

A first aspect of the embodiments of the present invention discloses a method for adjusting a data packet length in near field communication NFC, where the method includes:

determining, by an NFCC of a first NFC device, whether the NFCC is responsible for determining a maximum length value of data packets transmitted in subsequent communication;

if the NFCC is responsible for determining the maximum length value of the data packets transmitted in the subsequent communication, sending, by the NFCC, a first request including a first length value to a second NFC device, where the first request is used to instruct to adjust the maximum length value of the data packets transmitted between the first NFC device and the second NFC device in the subsequent communication to the first length value, the first request further includes a first device identification number DID, and the first length value is a value determined by the NFCC;

receiving, by the NFCC, a first response that is returned by the second NFC device for the first request, where the first response includes a second DID; and if the first DID is the same as the second DID, using, by the NFCC, the first length value as the maximum length value of the data packets transmitted in the subsequent communication.

In a first possible implementation manner of the first aspect of the embodiments of the present invention, the determining whether the NFCC is responsible for determining a maximum length value of data packets transmitted in subsequent communication includes:

determining whether a value of a first parameter is a first specific value, where the first specific value is used to represent that the NFCC is responsible for determining the maximum length value of the data packets transmitted in the subsequent communication, and the value of the first parameter is a default value of the NFCC, or a value configured by a DH of the first device for the NFCC.

With reference to the first aspect of the embodiments of the present invention, in a second possible implementation manner of the first aspect of the embodiments of the present invention, the method further includes:

sending, by the NFCC, a first notification including the first length value to a DH of the first NFC device, where the first notification is used to notify the DH that a first radio frequency RF interface has been activated;

receiving, by the NFCC by using the first RF interface, a data message sent by the DH, and encapsulating a payload in the data message into a data packet by using the first length value as the maximum length value; and sending, by the NFCC, the data packet to the second NFC device.

With reference to the first possible implementation manner of the first aspect of the embodiments of the present invention, in a third possible implementation manner of the first aspect of the embodiments of the present invention, the method further includes:

sending, by the NFCC, a first notification including the first length value to the DH, where the first notification is used to notify the DH that a first radio frequency RF interface has been activated;

receiving, by the NFCC by using the first RF interface, a data message sent by the DH, and encapsulating a payload in the data message into a data packet by using the first length value as the maximum length value; and sending, by the NFCC, the data packet to the second NFC device.

With reference to the first aspect of the embodiments of the present invention, the first possible implementation manner of the first aspect of the embodiments of the present invention, the second possible implementation manner of the first aspect of the embodiments of the present invention, or the third possible implementation manner of the first aspect of the embodiments of the present invention, in a fourth possible implementation manner of the first aspect of the embodiments of the present invention, the method further includes:

if the NFCC is not responsible for determining the maximum length value of the data packets transmitted in the subsequent communication, skipping sending, by the NFCC, the first request including the first length value to the second NFC device.

With reference to the second or third possible implementation manner of the first aspect of the embodiments of the present invention, in a fifth possible implementation manner of the first aspect of the embodiments of the present invention, the first request is a parameter selection request PSL_REQ defined in the Digital specification;

the first response is a parameter selection response PSL_RES defined in the Digital specification;

the first RF interface is a Near Field Communication Data Exchange Protocol NFC-DEP radio frequency interface defined in the NFC controller interface NCI specification; and the first notification is a radio frequency interface-activated notification RF_INTF_ACTIVATED_NTF defined in the NCI specification.

A second aspect of the embodiments of the present invention discloses a method for adjusting a data packet length in near field communication NFC, where the method includes:

receiving, by an NFCC of a first NFC device, an adjustment command that is sent by a DH of the first NFC device and that includes a first length value, where the adjustment command is used to instruct the NFCC to adjust a maximum length value of data packets transmitted in a subsequent communication process;

sending, by the NFCC, a first request including the first length value to a second NFC device, where the first request is used to instruct to adjust the maximum length value of the data packets transmitted between the first NFC device and the second NFC device in the subsequent communication process to the first length value, the first request further includes a first DID, and the first length value is a value determined by the NFCC;

receiving, by the NFCC, a first response that is returned by the second NFC device for the first request, where the first response includes a second DID; and if the first DID is the same as the second DID, using, by the NFCC, the first length value as the maximum length value of the data packets transmitted in the subsequent communication.

In a first possible implementation manner of the second aspect of the embodiments of the present invention, the method further includes:

sending, by the NFCC, an adjustment response including a status indication and/or the first length value to the DH, where the status indication is used to represent that the NFCC already adjusts the maximum length value to the first length value.

With reference to the first possible implementation manner of the second aspect of the embodiments of the present invention, in a second possible implementation manner of the second aspect of the embodiments of the present invention, before the receiving an adjustment command that is sent by the DH of the first NFC device and that includes a first length value, the method further includes:

activating, by the NFCC, a first RF interface, and sending a first notification to the DH, where the first notification is used to notify the DH that the first RF interface has been activated.

With reference to the first possible implementation manner of the second aspect of the embodiments of the present invention, in a third possible implementation manner of the second aspect of the embodiments of the present invention, before the sending a first request including the first length value to a second NFC device, the method further includes:

determining that the first length value is less than or equal to a second length value and less than or equal to a third length value.

With reference to the second possible implementation manner of the second aspect of the embodiments of the present invention, in a fourth possible implementation manner of the second aspect of the embodiments of the present invention, the method further includes:

receiving, by the NFCC by using the first RF interface, a first data message sent by the DH, and encapsulating a payload in the first data message into a first data packet by using the first length value as the maximum length value; and sending, by the NFCC, the first data packet to the second NFC device.

With reference to the third possible implementation manner of the second aspect of the embodiments of the present invention, in a fifth possible implementation manner of the second aspect of the embodiments of the present invention, the method further includes:

sending, by the NFCC, a second notification to the DH, where the second notification is used to notify the DH that a second RF interface has been activated; receiving, by using the second RF interface, a second data message sent by the DH, and encapsulating a payload in the second data message into a second data packet by using the first length value as the maximum length value; and sending, by the NFCC, the second data packet to the second NFC device.

With reference to the second possible implementation manner of the second aspect of the embodiments of the present invention, in a sixth possible implementation manner of the second aspect of the embodiments of the present invention, the first request is a PSL_REQ defined in the Digital specification;

the first response is a PSL_RES defined in the Digital specification;

the first RF interface is an NFC-DEP radio frequency interface defined in the NCI specification; and the first notification is an RF_INTF_ACTIVATED_NTF defined in the NCI specification.

A third aspect of the embodiments of the present invention provides an NFCC, where the NFCC is an NFCC of a first NFC device, and the NFCC includes a judgment module, a communications module, and a determining module, where the judgment module is configured to determine whether the NFCC is responsible for determining a maximum length value of data packets transmitted in subsequent communication;

the communications module is configured to: when a determining result of the judgment module is yes, send a first request including a first length value to a second NFC device, and receive a first response that is returned by the second NFC device for the first request, where the first request is used to instruct to adjust the maximum length value of the data packets transmitted between the first NFC device and the second NFC device in the subsequent communication to the first length value, the first request further includes a first DID, the first response includes a second DID, and the first length value is a value determined by the NFCC; and the determining module is configured to: when the first DID is the same as the second DID, use the first length value as the maximum length value of the data packets transmitted in the subsequent communication.

In a first possible implementation manner of the third aspect of the embodiments of the present invention, a specific manner of determining, by the judgment module, whether the NFCC is responsible for determining the maximum length value of the data packets transmitted in the subsequent communication is:

determining whether a value of a first parameter is a first specific value, where the first specific value is used to represent that the NFCC is responsible for determining the maximum length value of the data packets transmitted in the subsequent communication, and the value of the first parameter is a default value of the NFCC, or a value configured by a DH of the first NFC device for the NFCC.

With reference to the third aspect of the embodiments of the present invention, in a second possible implementation manner of the third aspect of the embodiments of the present invention, the communications module is further configured to: send a first notification including the first length value to a DH of the first NFC device, where the first notification is used to notify the DH that a first radio frequency RF interface has been activated; and receive, by using the first RF interface, a data message sent by the DH;

the NFCC further includes an encapsulation module, where the encapsulation module is configured to encapsulate a payload in the data message into a data packet by using the first length value as the maximum length value; and the communications module is further configured to send the data packet to the second NFC device.

With reference to the first possible implementation manner of the third aspect of the embodiments of the present invention, in a third possible implementation manner of the embodiments of the present invention, the communications module is further configured to send a first notification including the first length value to the DH, where the first notification is used to notify the DH that a first RF interface has been activated;

the communications module is further configured to receive, by using the first RF interface, a data message sent by the DH;

the NFCC further includes an encapsulation module, where the encapsulation module is configured to encapsulate a payload in the data message into a data packet by using the first length value as the maximum length value; and the communications module is further configured to send the data packet to the second NFC device.

With reference to the second or third possible implementation manner of the third aspect of the embodiments of the present invention, in a fourth possible implementation manner of the third aspect of the embodiments of the present invention, the first request is a PSL_REQ defined in the Digital specification;

the first response is a PSL_RES defined in the Digital specification;

the first RF interface is an NFC-DEP radio frequency interface defined in the NCI specification; and the first notification is an RF_INTF_ACTIVATED_NTF defined in the NCI specification.

A fourth aspect of the embodiments of the present invention provides an NFCC, where the NFCC is an NFCC of a first NFC device, and the NFCC includes a communications module and a determining module, where the communications module is configured to receive an adjustment command that is sent by a DH of the first NFC device and that includes a first length value, where the adjustment command is used to instruct the NFCC to adjust a maximum length value of data packets transmitted in a subsequent communication process;

the communications module is further configured to: send a first request including the first length value to a second NFC device, and receive a first response that is returned by the second NFC device for the first request, where the first request is used to instruct to adjust the maximum length value of the data packets transmitted between the first NFC device and the second NFC device in the subsequent communication process to the first length value, the first request further includes a first DID, and the first response includes a second DID; and the determining module is configured to: when the first DID is the same as the second DID, use the first length value as the maximum length value of the data packets transmitted in the subsequent communication.

In a first possible implementation manner of the fourth aspect of the embodiments of the present invention, the communications module is further configured to send an adjustment response including a status indication and/or the first length value to the DH, where the status indication is used to represent that the NFCC already adjusts the maximum length value to the first length value.

With reference to the first possible implementation manner of the fourth aspect of the embodiments of the present invention, in a second possible implementation manner of the fourth aspect of the embodiments of the present invention, the NFCC further includes an activation module, where the activation module is configured to: before the communications module receives the adjustment command that is sent by the DH of the first NFC device and that includes the first length value, activate a first RF interface; and the communications module is further configured to send a first notification to the DH, where the first notification is used to notify the DH that the first RF interface has been activated.

With reference to the first possible implementation manner of the fourth aspect of the embodiments of the present invention, in a third possible implementation manner of the fourth aspect of the embodiments of the present invention, the determining module is further configured to: before the communications module sends the first request including the first length value to the second NFC device, determine that the first length value is less than or equal to a second length value and less than or equal to a third length value.

With reference to the second possible implementation manner of the fourth aspect of the embodiments of the present invention, in a fourth possible implementation manner of the fourth aspect of the embodiments of the present invention, the communications module is further configured to receive, by using the first RF interface, a first data message sent by the DH;

the NFCC further includes a first encapsulation module, where the first encapsulation module is configured to encapsulate a payload in the first data message into a first data packet by using the first length value as the maximum length value; and the communications module is further configured to send the first data packet to the second NFC device.

With reference to the third possible implementation manner of the fourth aspect of the embodiments of the present invention, in a fifth possible implementation manner of the fourth aspect of the embodiments of the present invention, the communications module is further configured to: send a second notification to the DH, where the second notification is used to notify the DH that a second RF interface has been activated; and receive, by using the second RF interface, a second data message sent by the DH;

the NFCC further includes a second encapsulation module, where the second encapsulation module is configured to encapsulate a payload in the second data message into a second data packet by using the first length value as the maximum length value; and the communications module is further configured to send the second data packet to the second NFC device.

With reference to the second possible implementation manner of the fourth aspect of the embodiments of the present invention, in a sixth possible implementation manner of the fourth aspect of the embodiments of the present invention, the first request is a PSL_REQ defined in the Digital specification;

the first response is a PSL_RES defined in the Digital specification;

the first RF interface is an NFC-DEP radio frequency interface defined in the NCI specification; and the first notification is an RF_INTF_ACTIVATED_NTF defined in the NCI specification.

A fifth aspect of the embodiments of the present invention provides an NFCC, including a processor and a communications apparatus, where the processor is configured to determine whether the NFCC is responsible for determining a maximum length value of data packets transmitted in subsequent communication;

the communications apparatus is configured to: when a determining result of the processor is yes, send a first request including a first length value to a second NFC device, and receive a first response that is returned by the second NFC device for the first request, where the first request is used to instruct to adjust the maximum length value of the data packets transmitted between a first NFC device and the second NFC device in the subsequent communication to the first length value, the first length value is a value determined by the NFCC, the first request further includes a first DID, and the first response includes a second DID; and the processor is further configured to: when the first DID is the same as the second DID, use the first length value as the maximum length value of the data packets transmitted in the subsequent communication.

In a first possible implementation manner of the fifth aspect of the embodiments of the present invention, the determining whether the NFCC is responsible for determining a maximum length value of data packets transmitted in subsequent communication includes:

determining whether a value of a first parameter is a first specific value, where the first specific value is used to represent that the NFCC is responsible for determining the maximum length value of the data packets transmitted in the subsequent communication, and the value of the first parameter is a default value of the NFCC, or a value configured by a DH of the first NFC device for the NFCC.

With reference to the fifth aspect of the embodiments of the present invention, in a second possible implementation manner of the fifth aspect of the embodiments of the present invention, the communications apparatus is further configured to send a first notification including the first length value to a DH of the first NFC device, where the first notification is used to notify the DH that a first RF interface has been activated;

the communications apparatus is further configured to receive, by using the first RF interface, a data message sent by the DH;

the processor is further configured to encapsulate a payload in the data message into a data packet by using the first length value as the maximum length value; and the communications apparatus is further configured to send the data packet to the second NFC device.

With reference to the first possible implementation manner of the fifth aspect of the embodiments of the present invention, in a third possible implementation manner of the fifth aspect of the embodiments of the present invention, the communications apparatus is further configured to send a first notification including the first length value to the DH, where the first notification is used to notify the DH that a first RF interface has been activated;

the communications apparatus is further configured to receive, by using the first RF interface, a data message sent by the DH;

the processor is further configured to encapsulate a payload in the data message into a data packet by using the first length value as the maximum length value; and the communications apparatus is further configured to send the data packet to the second NFC device.

With reference to the second or third possible implementation manner of the fifth aspect of the embodiments of the present invention, in a fourth possible implementation manner of the fifth aspect of the embodiments of the present invention, the first request is a PSL_REQ defined in the Digital specification;

the first response is a PSL_RES defined in the Digital specification;

the first RF interface is an NFC-DEP radio frequency interface defined in the NCI specification; and the first notification is an RF_INTF_ACTIVATED_NTF defined in the NCI specification.

A sixth aspect of the embodiments of the present invention discloses an NFCC, including a processor and a communications apparatus, where the communications apparatus is configured to receive an adjustment command that is sent by a DH of a first NFC device and that includes a first length value, where the adjustment command is used to instruct the NFCC to adjust a maximum length value of data packets transmitted in a subsequent communication process;

the communications apparatus is further configured to: send a first request including the first length value to a second NFC device, and receive a first response that is returned by the second NFC device for the first request, where the first request is used to instruct to adjust the maximum length value of the data packets transmitted between the first NFC device and the second NFC device in the subsequent communication process to the first length value, the first request further includes a first DID, and the first response includes a second DID; and the processor is configured to: when the first DID is the same as the second DID, use the first length value as the maximum length value of the data packets transmitted in the subsequent communication.

In a first possible implementation manner of the sixth aspect of the embodiments of the present invention, the communications apparatus is further configured to send an adjustment response including a status indication and/or the first length value to the DH, where the status indication is used to represent that the NFCC already adjusts the maximum length value to the first length value.

With reference to the first possible implementation manner of the sixth aspect of the embodiments of the present invention, in a second possible implementation manner of the sixth aspect of the embodiments of the present invention, the processor is further configured to: before the communications apparatus receives the adjustment command that is sent by the DH of the first NFC device and that includes the first length value, activate a first RF interface; and the communications apparatus is further configured to send a first notification to the DH, where the first notification is used to notify the DH that the first RF interface has been activated.

With reference to the first possible implementation manner of the sixth aspect of the embodiments of the present invention, in a third possible implementation manner of the sixth aspect of the embodiments of the present invention, the processor is further configured to: before the communications apparatus sends the first request including the first length value to the second NFC device, determine that the first length value is less than or equal to a second length value and less than or equal to a third length value.

With reference to the second possible implementation manner of the sixth aspect of the embodiments of the present invention, in a fourth possible implementation manner of the sixth aspect of the embodiments of the present invention, the communications apparatus is further configured to receive, by using the first RF interface, a first data message sent by the DH;

the processor is further configured to encapsulate a payload in the first data message into a first data packet by using the first length value as the maximum length value; and the communications apparatus is further configured to send the first data packet to the second NFC device.

With reference to the third possible implementation manner of the sixth aspect of the embodiments of the present invention, in a fifth possible implementation manner of the sixth aspect of the embodiments of the present invention, the communications apparatus is further configured to: send a second notification to the DH, where the second notification is used to notify the DH that a second RF interface has been activated; and receive, by using the second RF interface, a second data message sent by the DH;

the processor is further configured to encapsulate a payload in the second data message into a second data packet by using the first length value as the maximum length value; and the communications apparatus is further configured to send the second data packet to the second NFC device.

With reference to the second possible implementation manner of the sixth aspect of the embodiments of the present invention, in a sixth possible implementation manner of the sixth aspect of the embodiments of the present invention, the first request is a PSL_REQ defined in the Digital specification;

the first response is a PSL_RES defined in the Digital specification;

the first RF interface is an NFC-DEP radio frequency interface defined in the NCI specification; and the first notification is an RF_INTF_ACTIVATED_NTF defined in the NCI specification.

In the embodiments of the present invention, an NFCC of a first NFC device used as an initiator determines whether the NFCC is responsible for determining a maximum length value of data packets transmitted in subsequent communication; if yes, sends a first request including a first length value to a second NFC device, where the first request is used to instruct to adjust the maximum length value of the data packets transmitted between the first NFC device and the second NFC device in the subsequent communication to the first length value, the first length value is a value determined by the NFCC of the first NFC device, and the first request further includes a first device identification number DID; receives a first response that is returned by the second NFC device for the first request and that includes a second DID; and when the first DID is the same as the second DID, uses the first length value as the maximum length value of the data packets transmitted in the subsequent communication. As can be seen, the embodiments of the present invention can implement, by using the NCI specification, a function that an NFCC of a first NFC device used as an initiator and a second NFC device used as a target adjust a maximum length value of communication data packets in a subsequent communication process.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiments of the present invention disclose a method for adjusting a data packet length in near field communication NFC, an apparatus, and a system, to implement, by means of the NCI specification, a function that an NFCC of a first NFC device used as an initiator and a second NFC device used as a target adjust a maximum length value of communication data packets in a subsequent communication process. Details are separately described below.

It should be noted that, a DH and an NFCC used in the embodiments of the present invention are terms used in the NCI protocol formulated by the NFC forum (NFC Forum). The DH is responsible for managing the entire NFC device, including: managing an NFC controller, for example, initialization, configuration, or power management. In a smartphone, the DH may correspond to a CPU of the phone. The DH may correspond to a terminal host (Terminal Host) in the host controller interface (HCI, Host Controller Interface) specification formulated in the European Telecommunication Standards Institute (ETSI, European Telecommunication Standards Institute). In addition, if a managing entity (ME, Managing Entity) in the specification formulated by the Global Platform (GP, Global Platform) is implemented on a terminal host (Terminal Host), the DH may also be referred to as a managing host (MH, Managing Host). The NFCC is an entity that is responsible for data transmission and that is of an NFC chip. Usually, the NFCC is referred to as the NFC chip. The NFCC may correspond to a contactless front-end (CLF, Contactless Front-end) in the HCI specification formulated by the European Telecommunication Standards Institute (ETSI, European Telecommunication Standards Institute). In this case, a host controller (Host Controller) in the HCI needs to be implemented on the NFCC.

Figure 1:
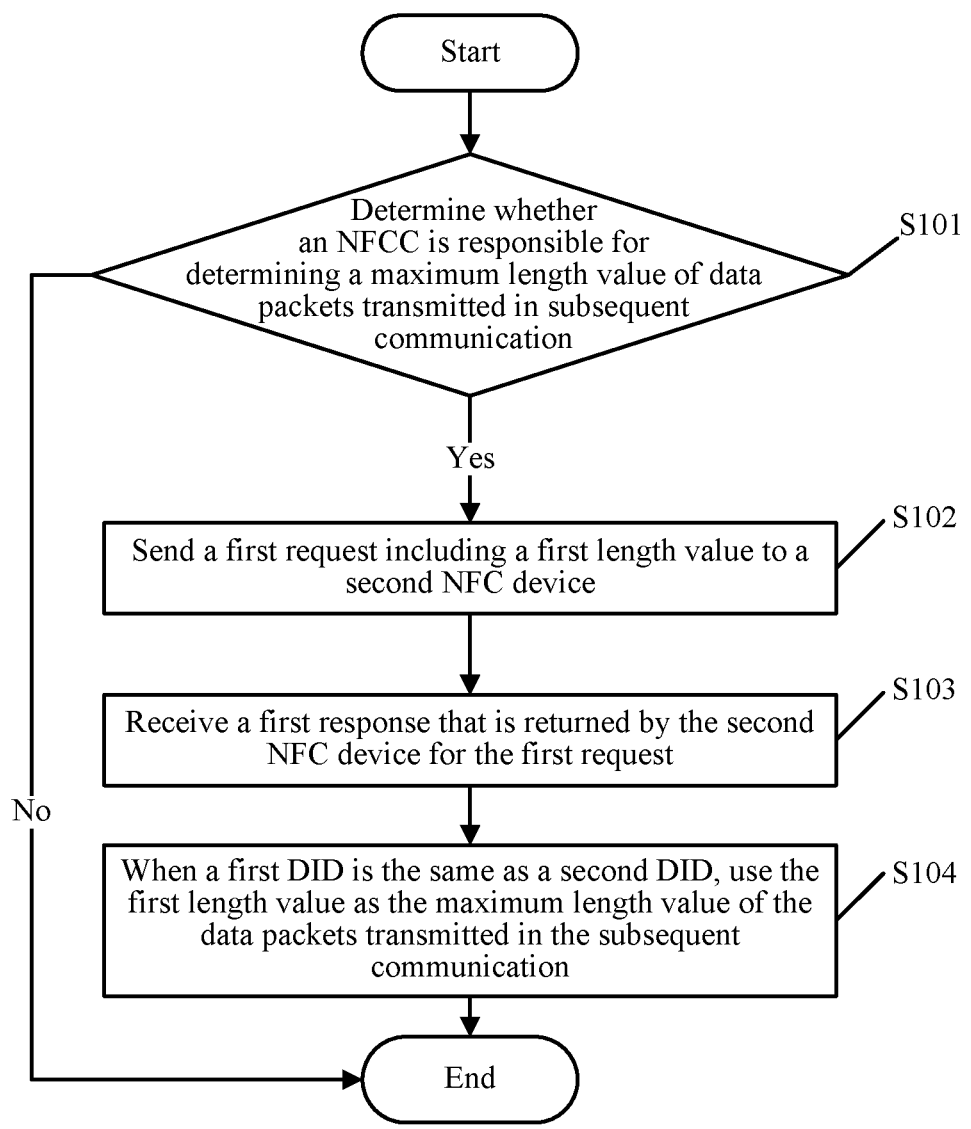
FIG. 1 is a schematic flowchart of a method for adjusting a data packet length in near field communication NFC according to an embodiment of the present invention.

Referring to FIG. 1, FIG. 1 is a schematic flowchart of a method for adjusting a data packet length in near field communication NFC according to an embodiment of the present invention. The method shown in FIG. 1 is applied to an NFCC of a first NFC device used as an initiator. As shown in FIG. 1, the method for adjusting a data packet length in near field communication NFC may include the following steps:

S101: Determine whether the NFCC is responsible for determining a maximum length value of data packets transmitted in subsequent communication.

In this embodiment of the present invention, when a determining result of step S101 is yes, the NFCC of the first NFC device may perform step S102, that is, the NFCC of the first NFC device sends a first request including a first length value to a second NFC device used as a target; when the determining result of step S101 is no, the NFCC of the first NFC device may end the process, that is, the NFCC of the first NFC device does not send the first request including the first length value to the second NFC device.

In this embodiment of the present invention, before the NFCC of the first NFC device performs step S101, both the first NFC device and the second NFC device already activate a MAC layer, that is, the first NFC device and the second NFC device already obtain, through negotiation by using an ATR_REQ and an ATR_RES, the maximum length value of the data packets transmitted in the subsequent communication process, that is, a second length value and a third length value. The second length value is set by the first NFC device and that is used to limit a length (that is, a length of a data packet transmitted in a direction from the second NFC device to the first NFC device) of a data packet sent by the second NFC device in the subsequent communication process, and the third length value is set by the second NFC device and is used to limit a length (that is, a length of a data packet transmitted in a direction from the first NFC device to the second NFC device) of a data packet sent by the first NFC device in the subsequent communication process. That is, in the subsequent communication, the length of the data packet sent by the second NFC device cannot exceed the second length value, and the length of the data packet sent by the first NFC device cannot exceed the third length value.

In this embodiment of the present invention, when the determining result of step S101 is yes, it indicates that after the MAC layer is activated, the NFCC of the first NFC device can adjust the maximum length value of the data packets transmitted between the first NFC device and the second NFC device in the subsequent communication process. The maximum length value limits the length of the data packet transmitted in the direction from the first NFC device and the second NFC device and the length of the data packet transmitted in the direction from the second NFC device to the first NFC device.

S102: Send a first request including a first length value to a second NFC device.

In this embodiment of the present invention, the first request is used to instruct to adjust the maximum length value of the data packets transmitted between the first NFC device and the second NFC device in the subsequent communication process to the first length value included in the first request. The first length value is a length value determined by the NFCC of the first NFC device, the first length value is less than or equal to the second length value and less than or equal to the third length value, and the first request further includes a first device identification number DID (Device Identification Number).

In this embodiment of the present invention, the first request may be a parameter selection request PSL_REQ defined in the Digital specification defined by the NFC forum. The fifth byte (Byte 5) represents an FSL parameter, and a value of the byte defines a maximum length value of a command and a response. Further, values corresponding to the first and second bits (that is, b1 and b2 defined in the Digital specification) in the byte represent the maximum length value. For example, when the values of the two bits are 00b, the maximum length value is 64 bytes; when the values of the two bits are 01b, the maximum length value is 128 bytes; when the values of the two bits are 10b, the maximum length value is 192 bytes; and when the values of the two bits are 11b, the maximum length value is 254 bytes. Therefore, the maximum length value is adjusted by using the PSL_REQ and a PSL_RES. The adjustment may be understood as: The maximum length value is switched (switch) from one length value to another length value, or may be understood as: The maximum length value is obtained through re-negotiation, or modified. This embodiment of the present invention does not limit meaning of "adjusting".

The command and the response may be a command and a response that are used during communication performed by using the NFC-DEP protocol, for example, a data exchange protocol request (DEP_REQ, Data Exchange Protocol Request) and a data exchange protocol response (DEP_RES, Data Exchange Protocol Response). The command and the response may be used as payloads (payload, that is, service data related to an upper-layer application) and are encapsulated into a data packet (Data). Then, an NFC device sends the data packet in a format of an NFC-A technology (that is, the type A radio frequency technology defined by the NFC forum, corresponding to an abbreviation of type A of ISO/IEC 14443) standard frame (NFC-A Technology standard frame) or in a format of an NFC-F technology (that is, the type F radio frequency technology defined in the NFC forum, corresponding to abbreviations of 212-kbps and 424-kbps communication mechanisms of ISO/IEC 18092) frame. Therefore, the maximum length value may be understood as a maximum value of data packet lengths, or may be understood as a maximum value of quantities of payload (payload) bytes of the command and the response.

In this embodiment of the present invention, the NFCC of the first NFC device sends the first request including the first length value to the second NFC device, so that the second NFC device does not return any response when the second NFC device does not agree to adjust the maximum length value of the data packets transmitted in the subsequent communication process to the first length value, or the second NFC device returns a response indicating that the second NFC device does not agree to adjust the maximum length value of the data packets transmitted in the subsequent communication process to the first length value, for example, a DID included in the response is not equal to the DID included in the first request, to indicate that the second NFC device does not agree to the first length value, or the second NFC device returns a response indicating that the second NFC device agrees to adjust the maximum length value of the data packets transmitted in the subsequent communication process to the first length value, for example, a device identification number DID included in the response is equal to the DID included in the first request, to indicate that the second NFC device agrees to the first length value.

In this embodiment of the present invention, the NFCC of the first NFC device sends the first request including the first length value to the second NFC device, that is, the NFCC of the first NFC device sends the first request including the first length value to an NFCC of the second NFC device.

S103: Receive a first response that is returned by the second NFC device for the first request.

In this embodiment of the present invention, the first response may include a second DID.

S104: When a first DID is the same as a second DID, use the first length value as the maximum length value of the data packets transmitted in the subsequent communication.

In this embodiment of the present invention, when the first DID is the same as the second DID, the first response is used to represent that the second NFC device already adjusts the maximum length value of the data packets transmitted in the subsequent communication process to the first length value. The first DID and the second DID are a device identification number of the second NFC device. For example, for the NFC-DEP protocol, the second DID is an identifier that is allocated, when the first NFC device used as the initiator activates the MAC layer by using the ATR_REQ, by the first NFC device to the second NFC device used as the target and that is used to identify the second NFC device. Further for example, for the ISO-DEP protocol, the second DID is an identifier that is allocated, when a first NFC device used as a reader/writer (Reader/Writer) activates, by using an RATS Command or an ATTRIB Command, a second NFC device used as an NFC tag or card emulation, by the first NFC device to the second NFC device and that is used to identify the second NFC device.

In an optional implementation manner, the determining, by the NFCC of the first NFC device, whether the NFCC is responsible for determining a maximum length value of data packets transmitted in subsequent communication may include:

determining whether a value of a first parameter is a specific value, where the first specific value is used to represent that the NFCC of the first NFC device is responsible for determining the maximum length value of the data packets transmitted in the subsequent communication, and the value of the first parameter may be a default value (that is, a default value set in the NFCC when an NFC chip is at delivery) of the NFCC of the first NFC device, or may be a value configured by a DH of the first NFC device for the NFCC of the first NFC device. This is not limited in this embodiment of the present invention.

In an optional implementation manner, after the NFCC of the first NFC device performs step S104, the NFCC of the first NFC device may further perform the following operations:

sending a first notification including the first length value to the DH of the first NFC device, where the first notification is used to notify the DH of the first NFC device that a first radio frequency (RF, Radio Frequency) interface has been activated;

receiving, by using the first RF interface, a data message sent by the DH of the first NFC device, and encapsulating a payload in the data message into a data packet by using the first length value as the maximum length value, where a length value of the data packet is less than or equal to the first length value; and sending the data packet to the second NFC device.

In this optional implementation manner, an objective of sending, by the NFCC of the first NFC device, the first notification including the first length value to the DH of the first NFC device is to: report, to the DH of the first NFC device, that the adjusted maximum length value of the data packets transmitted between the first NFC device and the second NFC device in the subsequent communication are the first length value, so that after obtaining the first length value, the DH of the first NFC device may use the first length value in an upper layer service, for example, the DH of the first NFC device estimates time required for transmitting data related to the upper layer service in this communication; and notify the DH of the first NFC device that the first RF interface has been activated, that is, the NFCC of the first NFC device has prepared for receiving the data message sent by the DH of the first NFC device. The data message may be Data Message(s) defined in the NCI specification. The Data Message(s) are transmitted between the DH and the NFCC by means of transmission of Data Packet(s), and payloads (payload) in the data message(s) may carry the data related to the upper layer service.

In addition, in this optional implementation manner, the data packet may be understood as a frame that is defined in the Digital specification and that carries a DEP_REQ in a format of a corresponding technical frame, or may be understood as a DEP_REQ defined in the Digital specification. Then, the payload in the data message is encapsulated into the data packet by using the first length value as the maximum length value. That is, the payload in the data message is encapsulated into at least one DEP_REQ, and a length of the at least one DEP_REQ does not exceed the first length value, to ensure that the NFCC of the first NFC device can send (that is, the DEP_REQ is encapsulated into a frame in a corresponding format and is sent) the DEP_REQ in a corresponding frame format (for example, a format of an NFC-A technology standard frame, or a format of an NFC-F technology standard frame). Therefore, the sending the data packet to the second NFC device and a subsequent specific operation may be:

sending the DEP_REQ (in a format of a specific frame) to the second NFC device, so that when determining that a length value of the DEP_REQ is less than or equal to the first length value, the second NFC device returns a DEP_RES to the NFCC of the first NFC device;

receiving the DEP_RES returned by the second NFC device, and determining whether a length of the DEP_RES is less than or equal to the first length value; and when determining that the length of the DEP_RES is less than or equal to the first length value, obtaining the DEP_RES (specifically, data, related to the service, in the DEP_RES), and forwarding the DEP_RES to the DH of the first NFC device.

Optionally, the first request may be a PSL_REQ defined in the Digital specification, the first response may be a PSL_RES defined in the Digital specification, the first RF interface may be an NFC-DEP radio frequency interface defined in the NCI specification, and the first notification may be a radio frequency interface-activated notification RF_INTF_ACTIVATED_NTF defined in the NCI specification. This is not limited in this embodiment of the present invention.

It should be noted that, the first request may also be an RATS Command or an ATTRIB Command that is defined in the Digital specification and that is applicable to the ISO-DEP protocol, and an included FSDI (Frame Size for proximity coupling Device Integer) parameter is used to calculate a maximum length value FSD of a data packet (for example, an information block I-block or a payload payload of the I-block) that can be received by an NFC device (for example, a reader/writer) working in a poll (poll) mode. Correspondingly, the first response may also be an RATS Response or an ATTRIB Response defined in the Digital specification, and an FSCI (Frame Size for proximity Card Integer) parameter that may be included is used to calculate a maximum length value FSC of a data packet (for example, an information block I-block or a payload payload of the I-block) that can be received by an NFC device (for example, an NFC tag or card emulation) working in a poll mode. The first RF interface may be an ISO-DEP radio frequency interface or an NDEF radio frequency interface defined in the NCI specification, and the first notification may be an RF_INTF_ACTIVATED_NTF defined in the NCI specification. In this case, in addition to the original meaning, the "adjusting" used in the solutions of the present invention may be understood as negotiation, limitation, or the like. This is not limited in this embodiment of the present invention.

In addition, it should be noted that, understanding of "adjusting", illustrations of the maximum length value, the first length value, the second length value, and the third length value, illustrations of the first request and the first response, descriptions of the device identification number DID, and explanations of the first RF interface and the first notification are applicable to the following embodiments of the present invention, and details are not described subsequently again.

In this embodiment of the present invention, an NFCC of a first NFC device determines whether the NFCC is responsible for determining a maximum length value of data packets transmitted in subsequent communication; if yes, sends a first request including a first length value to a second NFC device, where the first request is used to instruct to adjust the maximum length value of the data packets transmitted between the first NFC device and the second NFC device in the subsequent communication to the first length value; when a first response that is returned by the second NFC device for the first request is received, and a first DID included in the first response is the same as a second DID included in the first request, the NFCC of the first NFC device determines that the first length value included in the first request is the maximum length value of the data packets transmitted between the first NFC device and the second NFC device in the subsequent communication process. As can be seen, this embodiment of the present invention can implement, by using the NCI specification, a function that an NFCC of a first NFC device used as an initiator and a second NFC device used as a target adjust a maximum length value of data packets in a subsequent communication process.

Figure 2:
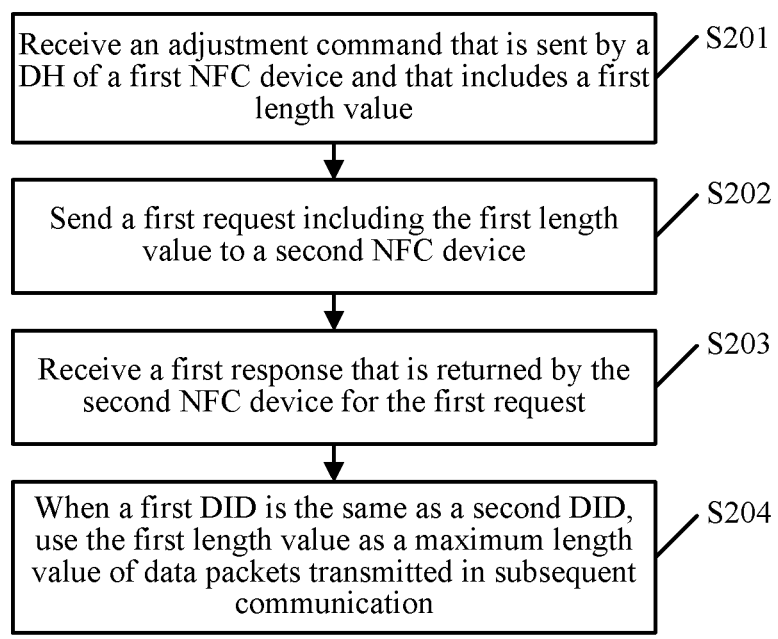
FIG. 2 is a schematic flowchart of another method for adjusting a data packet length in near field communication NFC according to an embodiment of the present invention.

Referring to FIG. 2, FIG. 2 is a schematic flowchart of another method for adjusting a data packet length in near field communication NFC according to an embodiment of the present invention. The method shown in FIG. 2 is applied to an NFCC of a first NFC device used as an initiator. As shown in FIG. 2, the method for adjusting a data packet length in near field communication NFC may include the following steps:

S201: Receive an adjustment command that is sent by a DH of the first NFC device and that includes a first length value.

In this embodiment of the present invention, the adjustment command is used to instruct the NFCC of the first NFC device to adjust a maximum length value of data packets transmitted in a subsequent communication process.

In this embodiment of the present invention, before the NFCC of the first NFC device performs step S201, both the first NFC device and the second NFC device already activate a MAC layer, that is, the first NFC device and the second NFC device already obtain, through negotiation by using an ATR_REQ and an ATR_RES, the maximum length value of the data packets transmitted in the subsequent communication process, that is, a second length value and a third length value. The second length value is set by the first NFC device and that is used to limit a length (that is, a length of a data packet transmitted in a direction from the second NFC device to the first NFC device) of a data packet sent by the second NFC device in the subsequent communication process, and the third length value is set by the second NFC device and is used to limit a length (that is, a length of a data packet transmitted in a direction from the first NFC device to the second NFC device) of a data packet sent by the first NFC device in the subsequent communication process. That is, in the subsequent communication, the length of the data packet sent by the second NFC device cannot exceed the second length value, and the length of the data packet sent by the first NFC device cannot exceed the third length value.

In this embodiment of the present invention, that the NFCC of the first NFC device receives the adjustment command means: After activating the MAC layer, the NFCC of the first NFC device can adjust the maximum length value of the data packets transmitted between the first NFC device and the second NFC device in the subsequent communication process. The maximum length value limits the length of the data packet transmitted in the direction from the first NFC device and the second NFC device and the length of the data packet transmitted in the direction from the second NFC device to the first NFC device.

S202: Send a first request including the first length value to a second NFC device.

In this embodiment of the present invention, the first request is used to instruct to adjust the maximum length value of the data packets transmitted between the first NFC device and the second NFC device in the subsequent communication process to the first length value included in the first request. The first length value is less than or equal to the second length value and less than or equal to the third length value. The first request further includes a first DID.

In this embodiment of the present invention, the NFCC of the first NFC device sends the first request including the first length value to the second NFC device, so that the second NFC device does not return any response when the second NFC device does not agree to adjust the maximum length value of the data packets transmitted in the subsequent communication process to the first length value, or the second NFC device returns a response indicating that the second NFC device does not agree to adjust the maximum length value of the data packets transmitted in the subsequent communication process to the first length value, for example, a DID included in the response is not equal to the DID included in the first request, to indicate that the second NFC device does not agree to the first length value, or the second NFC device returns a response indicating that the second NFC device agrees to adjust the maximum length value of the data packets transmitted in the subsequent communication process to the first length value, for example, a DID included in the response is equal to the DID included in the first request, to indicate that the second NFC device agrees to the first length value.

In this embodiment of the present invention, the NFCC of the first NFC device sends the first request including the first length value to the second NFC device, that is, the NFCC of the first NFC device sends the first request including the first length value to an NFCC of the second NFC device.

S203: Receive a first response that is returned by the second NFC device for the first request.

In this embodiment of the present invention, the first response includes a second DID.

S204: When a first DID is the same as a second DID, use the first length value as a maximum length value of data packets transmitted in subsequent communication.

In this embodiment of the present invention, when the second DID included in the first response is the same as the first DID included in the first request, the first response is used to represent that the second NFC device already adjusts the maximum length value of the data packets transmitted in the subsequent communication process to the first length value. The first DID and the second DID are a device identification number of the second NFC device. For example, for the NFC-DEP protocol, the second DID is an identifier that is allocated, when the first NFC device used as the initiator activates the MAC layer by using the ATR_REQ, by the first NFC device to the second NFC device used as a target and that is used to identify the second NFC device. Further for example, for the ISO-DEP protocol, the second DID is an identifier that is allocated, when a first NFC device used as a reader/writer (Reader/Writer) activates, by using an RATS Command or an ATTRIB Command, a second NFC device used as an NFC tag or card emulation, by the first NFC device to the second NFC device and that is used to identify the second NFC device.

In an optional implementation manner, after the NFCC of the first NFC device performs step S204, the NFCC of the first NFC device may further perform the following operation:

sending an adjustment response including a status indication and/or the first length value to the DH of the first NFC device, where the status indication is used to represent that the NFCC of the first NFC device already adjusts the maximum length value to the first length value, that is, the first NFC device and the second NFC device already complete this adjustment.

In an optional implementation manner, before step S201 is performed, the NFCC of the first NFC device may further perform the following operation:

activating a first RF interface, and sending a first notification to the DH of the first NFC device, where the first notification is used to notify the DH of the first NFC device that the first RF interface has been activated.

It should be noted that, in this case, the first NFC device and the second NFC device activate a MAC layer between the first NFC device and the second NFC device by using the ATR_REQ and the ATR_RES, that is, the first NFC device and the second NFC device already obtain, through negotiation, the maximum length value of the data packets transmitted in two directions in the subsequent communication, that is, the second length value and the third length value in the foregoing embodiment. In this embodiment of the present invention, when the NFCC of the first NFC device sends the first notification to the DH of the first NFC device, the first notification may carry a parameter value in the ATR_RES, where the parameter value includes the third length value. For details, refer to the NCI specification.

In another optional implementation manner, after step S201 is performed and before step S202 is performed, the NFCC of the first NFC device may further perform the following operation:

determining that the first length value is less than or equal to the second length value and less than or equal to the third length value.

It should be noted that, in this optional implementation manner, the DH of the first NFC device may send the adjustment command to the NFCC of the first NFC device before or after the NFCC of the first NFC device and the second NFC device directly activate the MAC layer. Because the DH of the first NFC device does not know specific values of the second length value and the third length value that the NFCC of the first NFC device and the second NFC device are to negotiate about or already obtain through negotiation, the first length value in the adjustment command sent by the DH of the first NFC device may be greater than, equal to, or less than the second length value or the third length value. Then, in order to avoid that the first length value exceeds the second length value or the third length value, the NFCC of the first NFC device needs to perform the foregoing operations, to ensure that the first length value is less than or equal to the second length value and the third length value.

In an optional implementation manner, when the NFCC of the first NFC device first activates the first RF interface and sends the first notification to the DH of the first NFC device, and then, performs step S201, after sending the adjustment response including the status indication and/or the first length value to the DH of the first NFC device, the NFCC of the first NFC device may further perform the following operations:

receiving, by using the first RF interface, a first data message sent by the DH of the first NFC device, and encapsulating a payload in the first data message into a first data packet by using the first length value as the maximum length value, where a length value of the first data packet is less than or equal to the first length value; and sending the first data packet to the second NFC device.

In an optional implementation manner, when an operation of determining that the first length value is less than or equal to the second length value and less than or equal to the third length value is implemented after step S201 and before step S202, after sending the adjustment response including the status indication and/or the first length value to the DH of the first NFC device, the NFCC of the first NFC device may further perform the following operations:

sending a second notification to the DH of the first NFC device, where the second notification is used to notify the DH of the first NFC device that a second RF interface has been activated;

receiving, by using the second RF interface, a second data message sent by the DH of the first NFC device, and encapsulating a payload in the second data message into a second data packet by using the first length value as the maximum length value, where a length value of the second data packet is less than or equal to the first length value; and sending the second data packet to the second NFC device.

It should be noted that, the second notification may include or may not include the first length value.

Optionally, the first request may be a PSL_REQ defined in the Digital specification, the first response may be a PSL_RES defined in the Digital specification, the first RF interface and the second RF interface may be NFC-DEP radio frequency interfaces defined in the NCI specification, and the first notification and the second notification may be radio frequency interface-activated notifications RF_INTF_ACTIVATED_NTFs defined in the NCI specification. This is not limited in this embodiment of the present invention.

It should be noted that, the first request may also be an RATS Command or an ATTRIB Command that is defined in the Digital specification and that is applicable to the ISO-DEP protocol, and an included FSDI (Frame Size for proximity coupling Device Integer) parameter is used to calculate a maximum length value FSD of a data packet (for example, an information block I-block or a payload payload of the I-block) that can be received by an NFC device (for example, a reader/writer) working in a poll (poll) mode. Correspondingly, the first response may also be an RATS Response or an ATTRIB Response defined in the Digital specification, and an FSCI (Frame Size for proximity Card Integer) parameter that may be included is used to calculate a maximum length value FSC of a data packet (for example, an information block I-block or a payload payload of the I-block) that can be received by an NFC device (for example, an NFC tag or card emulation) working in a poll mode. The first RF interface and the second RF interface may be ISO-DEP radio frequency interfaces or NDEF radio frequency interfaces defined in the NCI specification, and the first notification and the second notification may be RF_INTF_ACTIVATED_NTFs defined in the NCI specification. In this case, in addition to the original meaning, the "adjusting" used in the solutions of the present invention may be understood as negotiation, limitation, or the like. This is not limited in this embodiment of the present invention.

In this embodiment of the present invention, an NFCC of a first NFC device determines whether an adjustment command that includes a first length value and that is sent by a DH of the first NFC device is received, where the adjustment command is used to instruct the NFCC of the first NFC device to adjust a maximum length value of data packets transmitted in a subsequent communication process; when a determining result is yes, sends a first request including the first length value to a second NFC device, where the first request is used to adjust the maximum length value of the data packets transmitted between the first NFC device and the second NFC device in the subsequent communication process to the first length value; and when a first response that is returned by the second NFC device for the first request is received, and a first DID included in the first response is the same as a second DID included in the first request, the NFCC of the first NFC device determines that the first length value included in the first request is the maximum length value of the data packets transmitted between the first NFC device and the second NFC device in the subsequent communication process. As can be seen, this embodiment of the present invention can implement, by using the NCI specification, a function that an NFCC of a first NFC device used as an initiator and a second NFC device used as a target adjust a maximum length value of communication data packets in a subsequent communication process.

Figure 3:
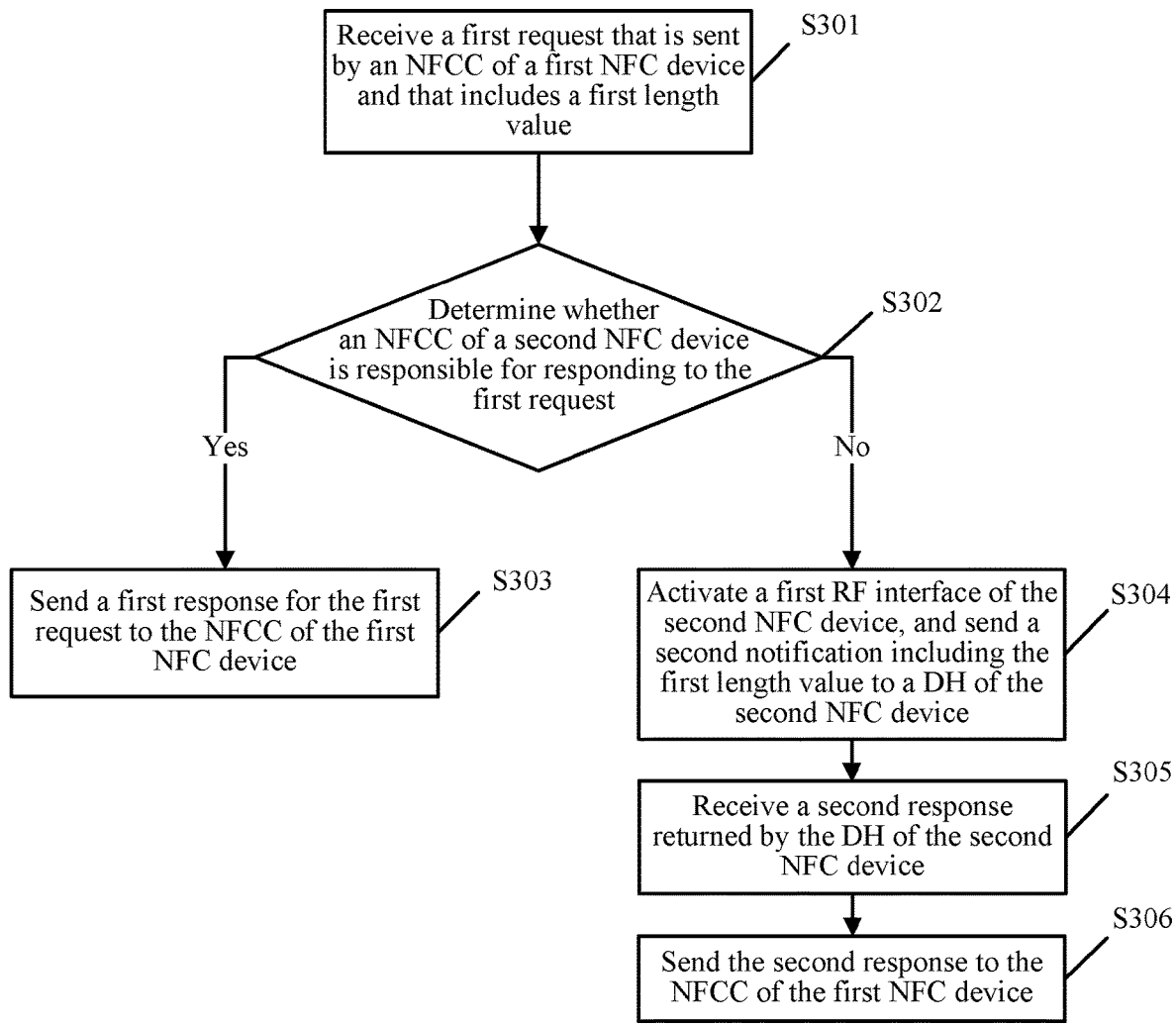
FIG. 3 is a schematic flowchart of still another method for adjusting a data packet length in near field communication NFC according to an embodiment of the present invention.

Referring to FIG. 3, FIG. 3 is a schematic flowchart of still another method for adjusting a data packet length in near field communication NFC according to an embodiment of the present invention. The method shown in FIG. 3 is applied to an NFCC of a second NFC device that performs peer-to-peer communication with a first NFC device used as an initiator and that is used as a target. As shown in FIG. 3, the method for adjusting a data packet length in near field communication NFC may include the following steps:

S301: Receive a first request that is sent by an NFCC of the first NFC device and that includes a first length value.

In this embodiment of the present invention, a premise that the NFCC of the second NFC device performs step S301 is that both the first NFC device and the second NFC device already activate a MAC layer, that is, the first NFC device and the second NFC device already obtain, through negotiation by using an ATR_REQ and an ATR_RES, a maximum length value of data packets transmitted in a subsequent communication process, that is, a second length value and a third length value. The second length value is set by the first NFC device and that is used to limit a length (that is, a length of a data packet transmitted in a direction from the second NFC device to the first NFC device) of a data packet sent by the second NFC device in the subsequent communication process, and the third length value is set by the second NFC device and is used to limit a length (that is, a length of a data packet transmitted in a direction from the first NFC device to the second NFC device) of a data packet sent by the first NFC device in the subsequent communication process. That is, in the subsequent communication, the length of the data packet sent by the second NFC device cannot exceed the second length value, and the length of the data packet sent by the first NFC device cannot exceed the third length value.

In this embodiment of the present invention, the first request that is received by the NFCC of the second NFC device and that includes the first length value is a request that is sent by the NFCC of the first NFC device after the NFCC determines that the NFCC is responsible for determining the maximum length value of the data packets transmitted in the subsequent communication or after the NFCC receives an adjustment command that is sent by a DH of the first NFC device, that includes the first length value, and that is used to instruct the NFCC of the first NFC device to adjust the maximum length value of the data packets transmitted in the subsequent communication process. The first request is used to instruct to adjust the maximum length value of the data packets transmitted between the first NFC device and the second NFC device in the subsequent communication process to the first length value included in the first request. The first length value is less than or equal to the second length value and less than or equal to the third length value. The first request may further include a first DID.

S302: Determine whether the NFCC of the second NFC device is responsible for responding to the first request.

In this embodiment of the present invention, when a determining result of step S302 is yes, the NFCC of the second NFC device may perform step S303; when the determining result of step S302 is no, the NFCC of the second NFC device may perform step S304. Optionally, the NFCC of the second NFC device may not return any response to the first NFC device, or return an error to the first NFC device. For example, when the NFCC of the second NFC device sets that a DID in the response is not equal to the DID in the first request, it indicates an error.

In this embodiment of the present invention, the NFCC of the second NFC device determines whether the NFCC is responsible for responding to the first request, that is, the NFCC of the second NFC device determines whether the NFCC of the second NFC device is responsible for determining the first length value included in the first request.

In an optional implementation manner, the determining, by the NFCC of the second NFC device, whether the NFCC of the second NFC device is responsible for responding to the first request may include:

determining whether a value of a first parameter in the NFCC of the second NFC device is a specific value, where the specific value is used to represent that the NFCC of the second NFC device is responsible for responding to the first request, and the value of the first parameter may be a default value (that is, a default value set in the NFCC when an NFC chip is at delivery) of the NFCC of the second NFC device, or may be a value configured by a DH of the second NFC device for the NFCC of the second NFC device. This is not limited in this embodiment of the present invention.

It should be noted that, the first parameter in this embodiment of the present invention and the first parameter in the foregoing embodiment may not be a same parameter.

S303: Send a first response for the first request to the NFCC of the first NFC device.

In this embodiment of the present invention, the first response may include a second DID.

In this embodiment of the present invention, the sending, by the NFCC of the second NFC device, a first response for the first request to the NFCC of the first NFC device may include:

determining whether the first length value in the first request is less than or equal to the second length value and less than or equal to the third length value;

when a determining result is yes, sending, to the NFCC of the first NFC device, the first response used to indicate that the second NFC device agrees to adjust the maximum length value of the data packets transmitted in the subsequent communication process to the first length value, where a second DID included in the first response is the same as the first DID included in the first request, and the second DID included in the first response and the first DID included in the first request are a device identification number of the second NFC device; and when the determining result is no, sending, to the NFCC of the first NFC device, the first response used to indicate that the second NFC device does not agree to adjust the maximum length value of the data packets transmitted in the subsequent communication process to the first length value, for example, a DID included in the first response is not equal to the DID included in the first request, to indicate that the second NFC device does not agree to the first length value.

Optionally, after step S303 is performed, and when the first response is used to indicate that the second NFC device agrees to adjust the maximum length value of the data packets transmitted in the subsequent communication process to the first length value, for example, the DID included in the first response is equal to the DID included in the first request (that is, the second NFC device agrees to the first length value), the NFCC of the second NFC device may further perform the following operation:

sending the first length value to the DH of the second NFC device by using a first notification.

S304: Activate a first RF interface of the second NFC device, and send a second notification including the first length value to a DH of the second NFC device.

In this embodiment of the present invention, the NFCC of the second NFC device sends the second notification including the first length value to the DH of the second NFC device, to notify the DH of the second NFC device that the first RF interface of the second NFC device has been activated, and the DH of the second NFC device determines whether the first length value is less than or equal to the second length value and less than or equal to the third length value.

S305: Receive a second response returned by the DH of the second NFC device.

In this embodiment of the present invention, the second response is used to indicate whether the DH of the second NFC device agrees to adjust the maximum length value of the data packets transmitted in the subsequent communication process to the first length value, and the second response is a second response returned by the DH of the second NFC device by using a data message (Data Message) after the DH of the second NFC device determines whether the first length value is less than or equal to the second length value and less than or equal to the third length value. That is, when the first length value is less than or equal to the second length value and less than or equal to the third length value, the second response is used to indicate that the DH of the second NFC agrees to adjust the maximum length value of the data packets transmitted in the subsequent communication process to the first length value; when the first length value is greater than the second length value and the first length value is greater than the third length value, the second response is used to indicate that the DH of the second NFC device does not agree to adjust the maximum length value of the data packets transmitted in the subsequent communication process to the first length value.

S306: Send the second response to the NFCC of the first NFC device.

Optionally, the first request may be a PSL_REQ defined in the Digital specification, the first response and the second response may be PSL_RESs defined in the Digital specification, the first RF interface may be an NFC-DEP radio frequency interface defined in the NCI specification, and the first notification and the second notification may be radio frequency interface-activated notifications RF_INTF_ACTIVATED_NTFs defined in the NCI specification. This is not limited in this embodiment of the present invention.

It should be noted that, optionally, the NFCC of the second NFC device may not perform step S304, that is, does not activate the first RF interface, and instead, reports the first length value to the DH by using a data packet (Data Message/Packet) defined in the NCI specification. Correspondingly, after step S305, the NFCC of the second NFC device may send the second notification to the DH, to notify the DH of the second NFC device that the first RF interface has been activated.

In addition, step S302 is optional, that is, the NFCC has a capability of processing and responding to the first request or permission to process and respond to the first request.

Optionally, after the second NFC device agrees to adjust the maximum length value of the data packets transmitted in the subsequent communication process to the first length value, the NFCC of the second NFC device may further perform the following operations:

receiving an encapsulated data packet (as described in the foregoing embodiment, the data packet may be understood as a DEP_REQ) sent by the NFCC of the first NFC device;

determining whether a length value of the data packet is less than or equal to the first length value; and when a determining result is yes, decapsulating the data packet to obtain data related to an upper layer service, and sending the data related to the upper layer service to the DH of the second NFC device by using the first RF interface.

In this embodiment of the present invention, an NFCC of a second NFC device used as a target receives a first request that is sent by an NFCC of a first NFC device used as an initiator and that is used to adjust a maximum length value of data packets transmitted in a subsequent communication process, and determines whether the NFCC of the second NFC device is responsible for responding to the first request; when a determining result is yes, returns a response for the first request to the NFCC of the first NFC device; when the determining result is no, activates an RF interface of the second NFC device, sends a notification including a first length value to a DH of the second NFC device, receives a response returned by the DH of the second NFC device, and sends the response to the NFCC of the first NFC device, where when a first DID included in the response is the same as a DID included in the first request, the response is used to indicate that the second NFC device already adjusts the maximum length value of the data packets transmitted in the subsequent communication process to the first length value. As can be seen, this embodiment of the present invention can implement, by using the NCI specification, a function that an NFCC of a first NFC device used as an initiator and a second NFC device used as a target adjust a maximum length value of communication data packets in a subsequent communication process.

Figure 4:
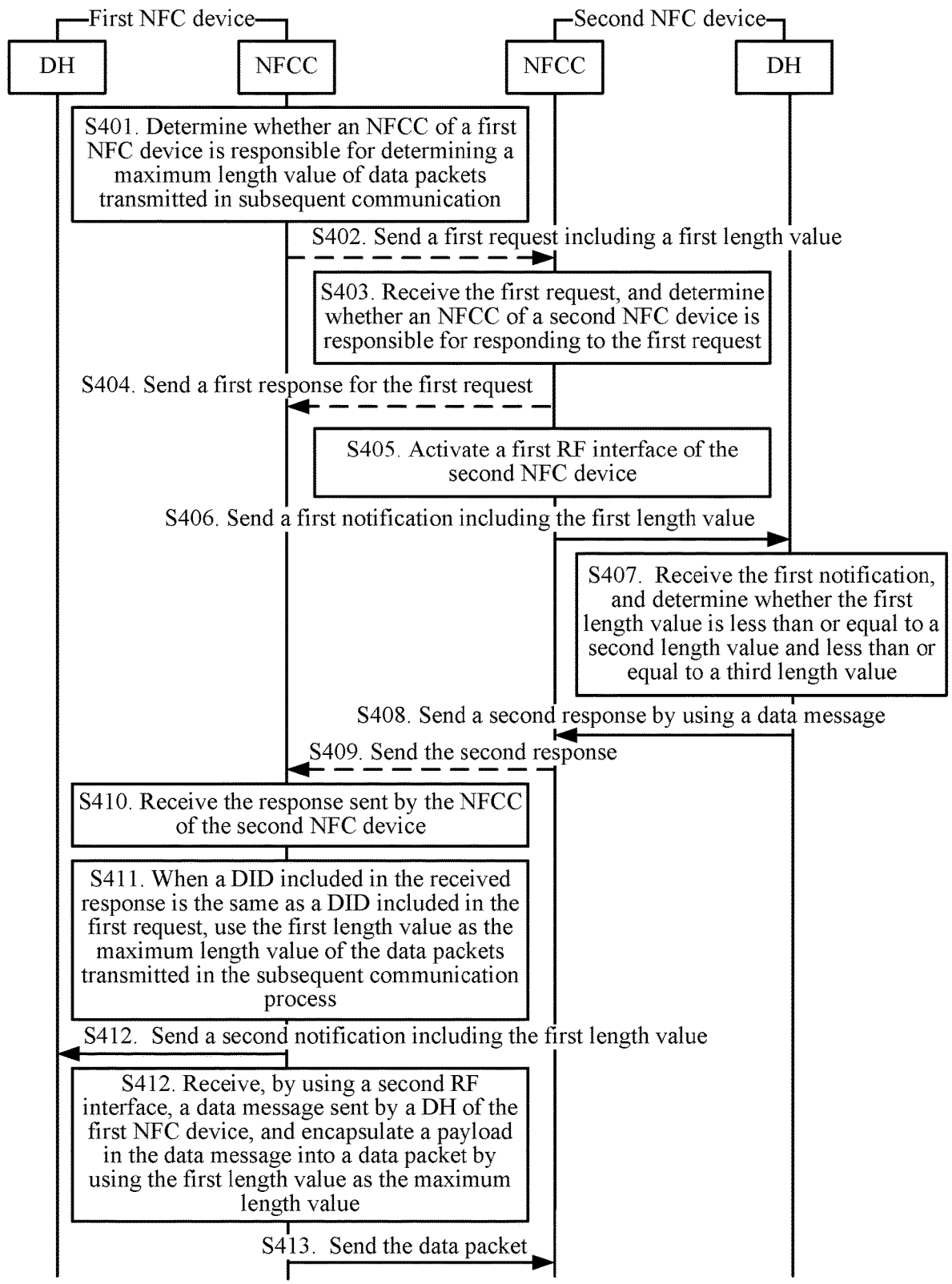
FIG. 4 is a schematic flowchart of still another method for adjusting a data packet length in near field communication NFC according to an embodiment of the present invention.

Referring to FIG. 4, FIG. 4 is a schematic flowchart of still another method for adjusting a data packet length in near field communication NFC according to an embodiment of the present invention. The method shown in FIG. 4 is applied to a first NFC device used as an initiator and a second NFC device used as a target. The first NFC device and the second NFC device each include at least an NFCC and a DH. Both the first NFC device and the second NFC device already activate a MAC layer, that is, the first NFC device and the second NFC device already obtain, through negotiation by using an ATR_REQ and an ATR_RES, a maximum length value of data packets transmitted in a subsequent communication process, that is, a second length value and a third length value. The second length value is set by the first NFC device and is used to limit a length (that is, a length of a data packet transmitted in a direction from the second NFC device to the first NFC device) of a data packet sent by the second NFC device in the subsequent communication process, and the third length value is set by the second NFC device and is used to limit a length (that is, a length of a data packet transmitted in a direction from the first NFC device to the second NFC device) of a data packet sent by the first NFC device in the subsequent communication process. That is, in the subsequent communication, the length of the data packet sent by the second NFC device cannot exceed the second length value, and the length of the data packet sent by the first NFC device cannot exceed the third length value. As shown in FIG. 4, the method for adjusting a data packet length in near field communication NFC may include the following steps:

S401: The NFCC of the first NFC device determines whether the NFCC is responsible for determining a maximum length value of data packets transmitted in subsequent communication.

In this embodiment of the present invention, when a determining result of step S401 is yes, the NFCC of the first NFC device performs step S402; when the determining result of step S401 is no, the NFCC of the first NFC device may end the process.

S402: The NFCC of the first NFC device sends a first request including a first length value to the NFCC of the second NFC device.

In this embodiment of the present invention, the first request is used to instruct to adjust the maximum length value of the data packets transmitted between the first NFC device and the second NFC device in the subsequent communication process to the first length value included in the first request. The first length value is a length value determined by the NFCC of the first NFC device, the first length value is less than or equal to the second length value and less than or equal to the third length value, and the first request may further include a first DID.

S403: The NFCC of the second NFC device receives the first request, and determines whether the NFCC of the second NFC device is responsible for responding to the first request.

In this embodiment of the present invention, when a determining result of step S403 is yes, the NFCC of the second NFC device may perform step S404; when the determining result of step S403 is no, the NFCC of the second NFC device may perform step S405.

S404: The NFCC of the second NFC device sends a first response for the first request to the NFCC of the first NFC device.

In this embodiment of the present invention, the sending, by the NFCC of the second NFC device, a first response for the first request to the NFCC of the first NFC device may include:

determining whether the first length value in the first request is less than or equal to the second length value and less than or equal to the third length value;

when a determining result is yes, sending, to the NFCC of the first NFC device, the first response used to indicate that the second NFC device agrees to adjust the maximum length value of the data packets transmitted in the subsequent communication process to the first length value, where the first DID included in the first response is the same as the second DID included in the first request, and the first DID included in the first response and the second DID included in the first request are a device identification number of the second NFC device; and when the determining result is no, sending, to the NFCC of the first NFC device, the first response used to indicate that the second NFC device does not agree to adjust the maximum length value of the data packets transmitted in the subsequent communication process to the first length value.

Optionally, when the first length value in the first request is greater than the second length value or greater than the third length value, the NFCC of the second NFC device may not return any response to the NFCC of the first NFC device, or may return a response error message to the NFCC of the first NFC device. This is not limited in this embodiment of the present invention.

S405: The NFCC of the second NFC device activates a first RF interface of the second NFC device.

S406: The NFCC of the second NFC device sends a first notification including the first length value to the DH of the second NFC device.

In this embodiment of the present invention, the NFCC of the second NFC device sends the first notification including the first length value to the DH of the second NFC device, to notify the DH of the second NFC device that the first RF interface of the second NFC device has been activated, and the DH of the second NFC device determines whether the first length value is less than or equal to the second length value and less than or equal to the third length value.

S407: The DH of the second NFC device receives the first notification, and determines whether the first length value is less than or equal to a second length value and less than or equal to a third length value.

In this embodiment of the present invention, when a determining result of step S407 is yes, the DH of the second NFC device may perform step S408; when the determining result of step S407 is no, the DH of the second NFC device may return the response error information to the NFCC of the second NFC device.

S408: The DH of the second NFC device sends a second response to the NFCC of the second NFC device by using a data message.

In this embodiment of the present invention, the second response is used to indicate whether the DH of the second NFC device agrees to adjust the maximum length value of the data packets transmitted in the subsequent communication process to the first length value.

S409: The NFCC of the second NFC device sends the second response to the NFCC of the first NFC device.

S410: The NFCC of the first NFC device receives the response sent by the NFCC of the second NFC device.

In this embodiment of the present invention, the response received by the NFCC of the first NFC device is the first response or the second response.

S411: When a DID included in the response received by the NFCC of the first NFC device is the same as a DID included in the first request, the NFCC of the first NFC device uses the first length value as the maximum length value of the data packets transmitted in the subsequent communication process.

Optionally, after step S411 is performed, the NFCC of the first NFC device may further perform step S412, step S413, and step S414.

S412: The NFCC of the first NFC device sends a second notification including the first length value to the DH of the first NFC device.

In this embodiment of the present invention, the second notification is used to notify the DH of the first NFC device that a second RF interface of the first NFC device has been activated.

In this embodiment of the present invention, an objective of sending, by the NFCC of the first NFC device, the second notification including the first length value to the DH of the first NFC device is to: report, to the DH of the first NFC device, that the adjusted maximum length value of the data packets transmitted between the first NFC device and the second NFC device in the subsequent communication are the first length value, so that after obtaining the first length value, the DH of the first NFC device may use the first length value in an upper layer service, for example, the DH of the first NFC device estimates time required for transmitting data related to the upper layer service in this communication; and notify the DH of the first NFC device that the second RF interface has been activated, that is, the NFCC of the first NFC device has prepared for receiving the data message sent by the DH of the first NFC device. The data message may be Data Message(s) defined in the NCI specification. The Data Message(s) are transmitted between the DH and the NFCC by means of transmission of Data Packet(s), and payloads (payload) in the data message(s) may carry the data related to the upper layer service.

S413: Receive, by using a second RF interface, a data message sent by the DH of the first NFC device, and encapsulate a payload in the data message into a data packet by using the first length value as the maximum length value.

In this embodiment of the present invention, the data message and the data packet are the data packet described in the foregoing embodiment. The data packet may be understood as a DEP_REQ, and a length value is less than or equal to the first length value.

S414: Send the data packet to the NFCC of the second NFC device.

Optionally, the determining, by the NFCC of the first NFC device, whether the NFCC is responsible for determining a maximum length value of data packets transmitted in subsequent communication may include:

determining whether a value of a first parameter in the NFCC of the first NFC device is a first specific value, where the first specific value is used to represent that the NFCC of the first NFC device is responsible for determining the maximum length value of the data packets transmitted in the subsequent communication, and the value of the first parameter may be a default value (that is, a default value set in the NFCC when an NFC chip is at delivery) of the NFCC of the first NFC device, or may be a value configured by the DH of the first NFC device for the NFCC of the first NFC device. This is not limited in this embodiment of the present invention.

For example, for the NFC-DEP protocol, assuming that the first parameter is PN_NFC_DEP_LENGTH, and occupies one byte (that is, an octet octet), and the first specific value is 0x00 (which certainly may be another value, here is merely an example), when a value of PN_NFC_DEP_LENGTH is 0x00, it indicates that the NFCC of the first NFC device is responsible for determining the maximum length value of the data packets transmitted in the subsequent communication, that is, the NFCC may determine to adjust the maximum length value according to conditions such as a capability of the NFCC. For the value of the first parameter PN_NFC_DEP_LENGTH, a default value may be set when the NFC chip is at delivery. If the default value is the first specific value, the NFCC of the first NFC device is responsible for determining by default the maximum length value of the data packets transmitted in the subsequent communication; otherwise, the NFCC of the first NFC device cannot be responsible for determining the maximum length value. Certainly, the DH may configure (that is, modify) the value of the first parameter for the NFCC by using a parameter configuration command (for example, CORE_SET_CONFIG_CMD) defined in the NCI specification.

Optionally, the determining, by the NFCC of the second NFC device, whether the NFCC of the second NFC device is responsible for responding to the first request may include:

determining whether a value of a second parameter in the NFCC of the second NFC device is a second specific value, where the second specific value is used to represent that the NFCC of the second NFC device is responsible for responding to the first request, and the second specific value may be a default value of the NFCC of the second NFC device, or may be a value configured by the DH of the second NFC device for the NFCC of the second NFC device. This is not limited in this embodiment of the present invention.

For example, for the NFC-DEP protocol, assuming that the second parameter is LN_NFC_DEP_LENGTH, and occupies one byte (that is, an octet octet), and the second specific value is 0x00 (which certainly may be another value, here is merely an example), when a value of LN_NFC_DEP_LENGTH is 0x00, it indicates that the NFCC of the second NFC device is responsible for determining the maximum length value of the data packets transmitted in the subsequent communication, that is, the NFCC may process and respond to the first request according to conditions such as a capability of the NFCC. For the value of the second parameter PN_NFC_DEP_LENGTH, a default value may be set when the NFC chip is at delivery. If the default value is the second specific value, the NFCC of the second NFC device is responsible for determining by default the maximum length value of the data packets transmitted in the subsequent communication; otherwise, the NFCC of the second NFC device cannot be responsible for determining the maximum length value. Certainly, the DH may configure (that is, modify) the value of the second parameter for the NFCC by using a parameter configuration command (for example, CORE_SET_CONFIG_CMD) defined in the NCI specification.

Optionally, after the NFCC of the second NFC device performs step S404, and when the first response is used to indicate that the second NFC device agrees to adjust the maximum length value of the data packets transmitted in the subsequent communication process to the first length value, the NFCC of the second NFC device may perform the following operation:

sending the first length value to the DH of the second NFC device by using a third notification.

Optionally, the first request may be a PSL_REQ defined in the Digital specification, the first response and the second response may be PSL_RESs defined in the Digital specification, the first RF interface and the second RF interface may be NFC-DEP radio frequency interfaces defined in the NCI specification, and the first notification, the second notification, and the third notification may be radio frequency interface-activated notifications RF_INTF_ACTIVATED_NTFs defined in the NCI specification. This is not limited in this embodiment of the present invention.

Optionally, the first request may be an RATS Command or an ATTRIB Command defined in the Digital specification, the first response and the second response may be RATS Responses or ATTRIB Responses defined in the Digital specification, the first RF interface and the second RF interface may be ISO-DEP radio frequency interfaces or NDEF radio frequency interfaces defined in the NCI specification, and the first notification, the second notification, and the third notification may be RF_INTF_ACTIVATED_NTFs defined in the NCI specification. This is not limited in this embodiment of the present invention.

As can be seen, this embodiment of the present invention can implement, by using the NCI specification, a function that an NFCC and an NFC device that is used as a target adjust a maximum length value of communication data packets in a subsequent communication process.

Figure 5:
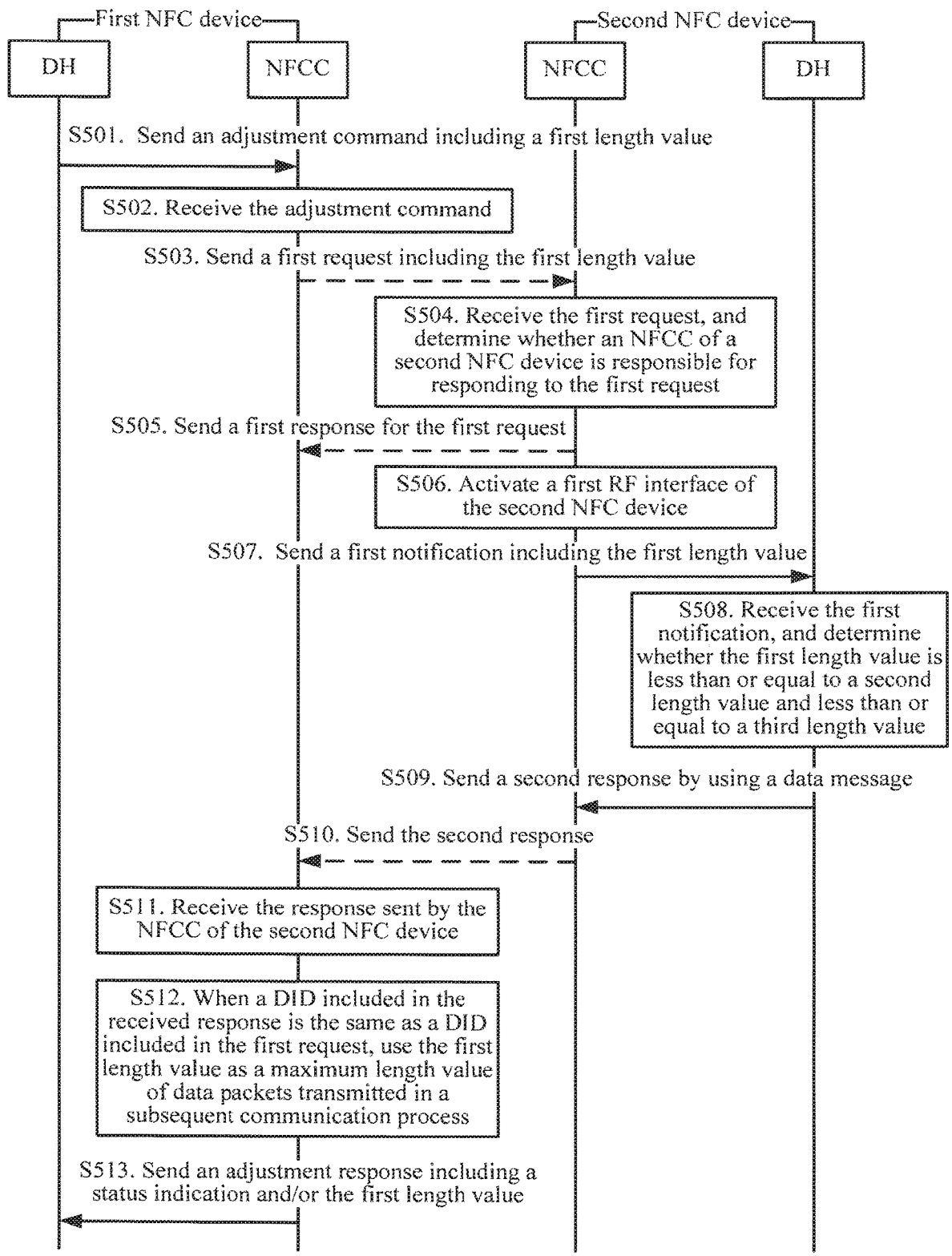
FIG. 5 is a schematic flowchart of still another method for adjusting a data packet length in near field communication NFC according to an embodiment of the present invention.

Referring to FIG. 5, FIG. 5 is a schematic flowchart of still another method for adjusting a data packet length in near field communication NFC according to an embodiment of the present invention. The method shown in FIG. 5 is applied to a first NFC device used as an initiator and a second NFC device used as a target. The first NFC device and the second NFC device each include at least an NFCC and a DH. Both the first NFC device and the second NFC device already activate a MAC layer, that is, the first NFC device and the second NFC device already obtain, through negotiation by using an ATR_REQ and an ATR_RES, a maximum length value of data packets transmitted in a subsequent communication process, that is, a second length value and a third length value. The second length value is set by the first NFC device and is used to limit a length (that is, a length of a data packet transmitted in a direction from the second NFC device to the first NFC device) of a data packet sent by the second NFC device in the subsequent communication process, and the third length value is set by the second NFC device and is used to limit a length (that is, a length of a data packet transmitted in a direction from the first NFC device to the second NFC device) of a data packet sent by the first NFC device in the subsequent communication process. That is, in the subsequent communication, the length of the data packet sent by the second NFC device cannot exceed the second length value, and the length of the data packet sent by the first NFC device cannot exceed the third length value. As shown in FIG. 5, the method for adjusting a data packet length in near field communication NFC may include the following steps:

S501: The DH of the first NFC device sends an adjustment command including a first length value to the NFCC of the first NFC device.

In this embodiment of the present invention, the adjustment command is used to instruct the NFCC of the first NFC device to adjust the maximum length value of the data packets transmitted in the subsequent communication process.

It should be noted that, the adjustment command (for example, an RF_LR_ADJUST_CMD or an RF_LR_SWITCH_CMD) may be used in an RFST_DISCOVERY state, an RFST_W4_ALL_DISCOVERIES state, an RFST_W4_HOST_SELECT state, or an RFST_POLL_ACTIVE state defined in the NCI specification, and a format includes but is not limited to formats shown in Table 1 and Table 2.

TABLE 1

| Adjustment command RF_LR_ADJUST_CMD RF_LR_ADJUST_CMD | | | | |
|---|---|---|---|---|
| Payload field | Length | | Value and meaning | |
| Quantity of parameters | 1 Octet | | Quantity n of parameters needing to be adjusted | |
| Parameter [1 . . . n] | x + 2 Octets | Identifier ID | 1 Octet | An identifier of the parameter, as shown in Table 2 |
| | | Length len | 1 Octet | Quantity of bytes occupied by the value Val |
| | | Value val | x Octets | Value of the parameter |

TABLE 2

| Identifier, length, and value of the parameter | | |
|---|---|---|
| Identifier ID | Length len | Value val |
| 0x00 | 1 Octet | First length value |
| 0x01-0x7F | | Reserved |
| 0x80-0xFF | | Dedicated |

In this embodiment, the first length value in the adjustment command may be a value that is determined by the DH of the first NFC device and that is less than or equal to the second length value and the third length value. In this case, the NFCC of the first NFC device may need to report a radio frequency activation notification including the first length value to the DH of the first NFC device before step S501. Certainly, whether the first length value does not exceed the second length value and the third length value may not be determined by the DH of the first NFC device. In this case, the NFCC of the first NFC device may need to determine the length value after receiving the adjustment command.

S502: The NFCC of the first NFC device receives the adjustment command.

S503: The NFCC of the first NFC device sends a first request including the first length value to the NFCC of the second NFC device.

In this embodiment of the present invention, the first request is used to instruct to adjust the maximum length value of the data packets transmitted between the first NFC device and the second NFC device in the subsequent communication process to the first length value included in the first request. The first length value is less than or equal to the second length value and less than or equal to the third length value. The first request may further include a first DID.

S504: The NFCC of the second NFC device receives the first request, and determines whether the NFCC of the second NFC device is responsible for responding to the first request.

In this embodiment of the present invention, when a determining result of step S504 is yes, the NFCC of the second NFC device may perform step S505; when the determining result of step S504 is no, the NFCC of the second NFC device may perform step S506.

S505: The NFCC of the second NFC device sends a first response for the first request to the NFCC of the first NFC device.

In this embodiment of the present invention, the first response may include a second DID, and the sending, by the NFCC of the second NFC device, a first response for the first request to the NFCC of the first NFC device may include:

determining whether the first length value in the first request is less than or equal to the second length value and less than or equal to the third length value;

when a determining result is yes, sending, to the NFCC of the first NFC device, the first response used to indicate that the second NFC device agrees to adjust the maximum length value of the data packets transmitted in the subsequent communication process to the first length value, where the DID included in the first response is the same as the DID included in the first request, and the DID included in the first response and the DID included in the first request are a device identification number of the second NFC device; and when the determining result is no, sending, to the NFCC of the first NFC device, the first response used to indicate that the second NFC device does not agree to adjust the maximum length value of the data packets transmitted in the subsequent communication process to the first length value.

Optionally, when the first length value in the first request is greater than the second length value or greater than the third length value, the NFCC of the second NFC device may not return any response to the NFCC of the first NFC device, or may return a response error message to the NFCC of the first NFC device. This is not limited in this embodiment of the present invention.

S506: The NFCC of the second NFC device activates a first RF interface of the second NFC device.

S507: The NFCC of the second NFC device sends a first notification including the first length value to the DH of the second NFC device.

In this embodiment of the present invention, the NFCC of the second NFC device sends the first notification including the first length value to the DH of the second NFC device, to notify the DH of the second NFC device that the first RF interface of the second NFC device has been activated, and the DH of the second NFC device determines whether the first length value is less than or equal to the second length value and less than or equal to the third length value.

S508: The DH of the second NFC device receives the first notification, and determines whether the first length value is less than or equal to a second length value and less than or equal to a third length value.

In this embodiment of the present invention, when a determining result of step S508 is yes, the DH of the second NFC device may perform step S509; when the determining result of step S508 is no, the DH of the second NFC device may return the response error information to the NFCC of the second NFC device.

S509: The DH of the second NFC device sends a second response to the NFCC of the second NFC device by using a data message.

In this embodiment of the present invention, the second response is used to indicate whether the DH of the second NFC device agrees to adjust the maximum length value of the data packets transmitted in the subsequent communication process to the first length value.

S510: The NFCC of the second NFC device sends the second response to the NFCC of the first NFC device.

S511: The NFCC of the first NFC device receives the response sent by the NFCC of the second NFC device.

In this embodiment of the present invention, the response received by the NFCC of the first NFC device is the first response or the second response.

S512: When a DID included in the response received by the NFCC of the first NFC device is the same as a DID included in the first request, the NFCC of the first NFC device uses the first length value as the maximum length value of the data packets transmitted in the subsequent communication process.

S513: The NFCC of the first NFC device returns an adjustment response including a status indication and/or the first length value to the DH of the first NFC device.

In this embodiment of the present invention, the status indication is used to represent that the NFCC of the first NFC device already adjusts the maximum value to the first length value, that is, that first NFC device and the second NFC device already complete this adjustment.

In an optional implementation manner, before the DH of the first NFC device performs step S501, the NFCC of the first NFC device may further perform the following operation:

activating a second RF interface of the first NFC device, and sending a second notification to the DH of the first NFC device, where the second notification is used to notify the DH of the first NFC device that the second RF interface of the first NFC device has been activated.

In another optional implementation manner, after step S502 is performed and before step S503 is performed, the NFCC of the first NFC device may further perform the following operation:

determining that the first length value is less than or equal to the second length value and less than or equal to the third length value.

In an optional implementation manner, after the NFCC of the second NFC device performs step S505, and when the first response is used to indicate that the second NFC device agrees to adjust the maximum length value of the data packets transmitted in the subsequent communication process to the first length value, the NFCC of the second NFC device may perform the following operation:

sending the first length value to the DH of the second NFC device by using a third notification.

In an optional implementation manner, when the NFCC of the first NFC device first activates the first RF interface and sends the first notification to the DH of the first NFC device, and then, the DH of the first NFC device performs step S501, after sending the adjustment response including the status indication and/or the first length value to the DH of the first NFC device, the NFCC of the first NFC device may further perform the following operations:

receiving, by using the second RF interface, a first data message sent by the DH of the first NFC device, and encapsulating a payload in the first data message into a first data packet by using the first length value as the maximum length value, where a length value of the first data packet is less than or equal to the first length value; and sending the first data packet to the NFCC of the second NFC device.

In an optional implementation manner, when an operation of determining that the first length value is less than or equal to the second length value and less than or equal to the third length value is implemented after step S502 and before step S503, after sending the adjustment response including the status indication and/or the first length value to the DH of the first NFC device, the NFCC of the first NFC device may further perform the following operations:

sending a fourth notification to the DH of the first NFC device, where the fourth notification is used to notify the DH of the first NFC device that a third RF interface has been activated;

receiving, by using the third RF interface, a second data message sent by the DH of the first NFC device, and encapsulating a payload in the second data message into a second data packet by using the first length value as the maximum length value; and sending the second data packet to the NFCC of the second NFC device.

In this embodiment of the present invention, the fourth notification may or may not include the first length value. The first data message, the second data message, the first data packet, and the second data packet are respectively the same as the data message and the data packet in the foregoing embodiments, and details are not described herein again. Optionally, the first request may be a PSL_REQ defined in the Digital specification, the first response and the second response may be PSL_RESs defined in the Digital specification, the first RF interface, the second RF interface, and the third RF interface may be NFC-DEP radio frequency interfaces defined in the NCI specification, and the first notification, the second notification, the third notification, and the fourth notification may be radio frequency interface-activated notifications RF_INTF_ACTIVATED_NTFs defined in the NCI specification. This is not limited in this embodiment of the present invention.

Optionally, the first request may be an RATS Command or an ATTRIB Command defined in the Digital specification, the first response and the second response may be RATS Responses or ATTRIB Responses defined in the Digital specification, the first RF interface, the second RF interface, and the third RF interface may be ISO-DEP radio frequency interfaces or NDEF radio frequency interfaces defined in the NCI specification, and the first notification, the second notification, the third notification, and the fourth notification may be RF_INTF_ACTIVATED_NTFs defined in the NCI specification. This is not limited in this embodiment of the present invention.

As can be seen, this embodiment of the present invention can implement, by using the NCI specification, a function that an NFCC of a first NFC device used as an initiator and a second NFC device used as a target adjust a maximum length value of communication data packets in a subsequent communication process.

Figure 6:
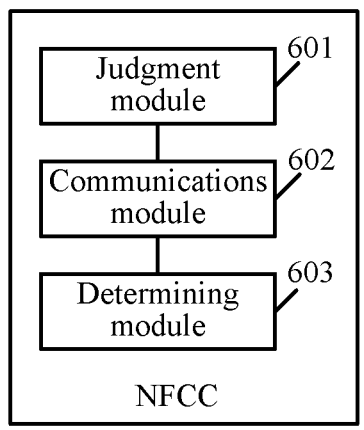
FIG. 6 is a schematic structural diagram of an NFCC according to an embodiment of the present invention.

Referring to FIG. 6, FIG. 6 is a schematic structural diagram of an NFCC according to an embodiment of the present invention. The NFCC is an NFCC of a first NFC device. As shown in FIG. 6, the NFCC may include a judgment module 601, a communications module 602, and a determining module 603.

In an embodiment, the judgment module 601 is configured to whether the NFCC is responsible for determining a maximum length value of data packets transmitted in subsequent communication, where the maximum length value limits a length of a data packet transmitted in a direction from the first NFC device to a second NFC device and a length of a data packet transmitted in a direction from the second NFC device to the first NFC device.

In this embodiment of the present invention, before the judgment module 601 performs corresponding operations, both the first NFC device and the second NFC device already activate a MAC layer, that is, the first NFC device and the second NFC device already obtain, through negotiation by using an ATR_REQ and an ATR_RES, the maximum length value of the data packets transmitted in the subsequent communication process, that is, a second length value and a third length value. The second length value is set by the first NFC device and that is used to limit a length (that is, the length of the data packet transmitted in the direction from the second NFC device to the first NFC device) of a data packet sent by the second NFC device in the subsequent communication process, and the third length value is set by the second NFC device and is used to limit a length (that is, the length of the data packet transmitted in the direction from the first NFC device to the second NFC device) of a data packet sent by the first NFC device in the subsequent communication process. That is, in the subsequent communication, the length of the data packet sent by the second NFC device cannot exceed the second length value, and the length of the data packet sent by the first NFC device cannot exceed the third length value.

The communications module 602 is configured to: when a determining result of the judgment module 601 is yes, send a first request including a first length value to the second NFC device, and receive a first response that is returned by the second NFC device for the first request, where the first request is used to instruct to adjust the maximum length value of the data packets transmitted between the first NFC device and the second NFC device in the subsequent communication to the first length value, the first length value is a value determined by the NFCC, the first request may further include a first DID, and the first response may include a second DID.

In this embodiment of the present invention, the first request may be a parameter selection request PSL_REQ defined in the Digital specification defined by the NFC forum. The fifth byte (Byte 5) represents an FSL parameter, and a value of the byte defines a maximum length value of a command and a response. Further, values corresponding to the first and second bits (that is, b1 and b2 defined in the Digital specification) in the byte represent the maximum length value. For example, when the values of the two bits are 00b, the maximum length value is 64 bytes; when the values of the two bits are 01b, the maximum length value is 128 bytes; when the values of the two bits are 10b, the maximum length value is 192 bytes; and when the values of the two bits are 11b, the maximum length value is 254 bytes. Therefore, the maximum length value is adjusted by using the PSL_REQ and a PSL_RES. The adjustment may be understood as: The maximum length value is switched (switch) from one length value to another length value, or may be understood as: The maximum length value is obtained through re-negotiation, or modified. This embodiment of the present invention does not limit meaning of "adjusting".

The command and the response may be a command and a response that are used during communication performed by using the NFC-DEP protocol, for example, a DEP_REQ and a DEP_RES. The command and the response may be used as payloads (payload, that is, service data related to an upper-layer application) and are encapsulated into a data packet (Data). Then, the NFC device sends the data packet in a format of an NFC-A technology (that is, the type A radio frequency technology defined in the NFC forum, corresponding to an abbreviation of type A of ISO/IEC 14443) standard frame or in a format of an NFC-F technology (that is, the type F radio frequency technology defined in the NFC forum, corresponding to abbreviations of 212-kbps and 424-kbps communication mechanisms of ISO/IEC 18092) frame. Therefore, the maximum length value may be understood as a maximum value of data packet lengths, or may be understood as a maximum value of quantities of payload (payload) bytes of the command and the response.

In this embodiment of the present invention, the communications module 602 sends the first request including the first length value to the second NFC device, so that the second NFC device does not return any response when the second NFC device does not agree to adjust the maximum length value of the data packets transmitted in the subsequent communication process to the first length value, or the second NFC device returns a response indicating that the second NFC device does not agree to adjust the maximum length value of the data packets transmitted in the subsequent communication process to the first length value, for example, a DID included in the response is not equal to the DID included in the first request, to indicate that the second NFC device does not agree to the first length value, or the second NFC device returns a response indicating that the second NFC device agrees to adjust the maximum length value of the data packets transmitted in the subsequent communication process to the first length value, for example, a device identification number DID included in the response is equal to the DID included in the first request, to indicate that the second NFC device agrees to the first length value.

The determining module 603 is configured to: when the first DID is the same as the second DID, use the first length value as the maximum length value of the data packets transmitted in the subsequent communication.

In this embodiment of the present invention, when the second DID included in the first response is the same as the first DID included in the first request, the first response is used to represent that the second NFC device already adjusts the maximum length value of the data packets transmitted in the subsequent communication process to the first length value. The first DID and the second DID are a device identification number of the second NFC device. For example, for the NFC-DEP protocol, the second DID is an identifier that is allocated, when the first NFC device used as the initiator activates the MAC layer by using the ATR_REQ, by the first NFC device to the second NFC device used as the target and that is used to identify the second NFC device. Further for example, for the ISO-DEP protocol, the second DID is an identifier that is allocated, when a first NFC device used as a reader/writer (Reader/Writer) activates, by using an RATS Command or an ATTRIB Command, a second NFC device used as an NFC tag or card emulation, by the first NFC device to the second NFC device and that is used to identify the second NFC device.

In an optional implementation manner, a specific manner of determining, by the determining module 601, whether the NFCC is responsible for determining the maximum length value of the data packets transmitted in the subsequent communication may be:

determining whether a value of a first parameter is a specific value, where the first specific value is used to represent that the NFCC of the first NFC device is responsible for determining the maximum length value of the data packets transmitted in the subsequent communication, and the value of the first parameter may be a default value (that is, a default value set in the NFCC when an NFC chip is at delivery) of the NFCC of the first NFC device, or may be a value configured by a DH of the first NFC device for the NFCC of the first NFC device. This is not limited in this embodiment of the present invention.

In an optional implementation manner, the communications module 602 may be further configured to send a first notification including the first length value to the DH of the first NFC device, where the first notification is used to notify the DH of the first NFC device that a first RF interface has been activated, and is further configured to receive, by using the first RF interface, a data message sent by the DH of the first NFC device.

In this optional implementation manner, an objective of sending, by the communications module 602, the first notification including the first length value to the DH of the first NFC device is to: report, to the DH of the first NFC device, that the adjusted maximum length value of the data packets transmitted between the first NFC device and the second NFC device in the subsequent communication are the first length value, so that after obtaining the first length value, the DH of the first NFC device may use the first length value in an upper layer service, for example, the DH of the first NFC device estimates time required for transmitting data related to the upper layer service in this communication; and notify the DH of the first NFC device that the first RF interface has been activated, that is, the communications module 602 has prepared for receiving the data message sent by the DH of the first NFC device. The data message may be Data Message(s) defined in the NCI specification. The Data Message(s) are transmitted between the DH and the NFCC by means of transmission of Data Packet(s), and payloads (payload) in the data message(s) may carry the data related to the upper layer service.

Figure 7:
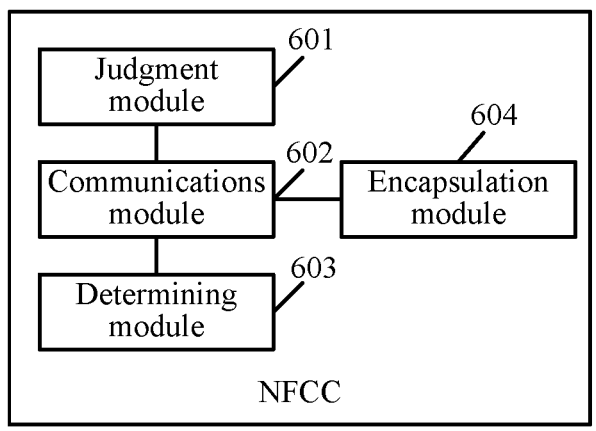
FIG. 7 is a schematic structural diagram of another NFCC according to an embodiment of the present invention.

In this optional implementation manner, the NFCC may further include an encapsulation module 604. The NFCC including the encapsulation module 604 may be shown in FIG. 7. FIG. 7 is a schematic structural diagram of another NFCC according to an embodiment of the present invention.

The encapsulation module 604 is configured to encapsulate a payload in the data message into a data packet by using the first length value as the maximum length value.

In this optional implementation manner, the communications module 602 may be further configured to send the data packet to the second NFC device.

Optionally, the first request may be a PSL_REQ defined in the Digital specification, the first response may be a PSL_RES defined in the Digital specification, the first RF interface may be an NFC-DEP radio frequency interface defined in the NCI specification, and the first notification may be a radio frequency interface-activated notification RF_INTF_ACTIVATED_NTF defined in the NCI specification. This is not limited in this embodiment of the present invention.

Optionally, the first request may also be an RATS Command or an ATTRIB Command that is defined in the Digital specification and that is applicable to the ISO-DEP protocol, and an included FSDI (Frame Size for proximity coupling Device Integer) parameter is used to calculate a maximum length value FSD of a data packet (for example, an information block I-block or a payload payload of the I-block) that can be received by an NFC device (for example, a reader/writer) working in a poll (poll) mode. Correspondingly, the first response may also be an RATS Response or an ATTRIB Response defined in the Digital specification, and an FSCI (Frame Size for proximity Card Integer) parameter that may be included is used to calculate a maximum length value FSC of a data packet (for example, an information block I-block or a payload payload of the I-block) that can be received by an NFC device (for example, an NFC tag or card emulation) working in a poll mode. The first RF interface may be an ISO-DEP radio frequency interface or an NDEF radio frequency interface defined in the NCI specification, and the first notification may be an RF_INTF_ACTIVATED_NTF defined in the NCI specification. In this case, in addition to the original meaning, the "adjusting" used in the solutions of the present invention may be understood as negotiation, limitation, or the like. This is not limited in this embodiment of the present invention.

As can be seen, this embodiment of the present invention can implement, by using the NCI specification, a function that an NFCC of a first NFC device used as an initiator and a second NFC device used as a target adjust a maximum length value of communication data packets in a subsequent communication process.

Figure 8:
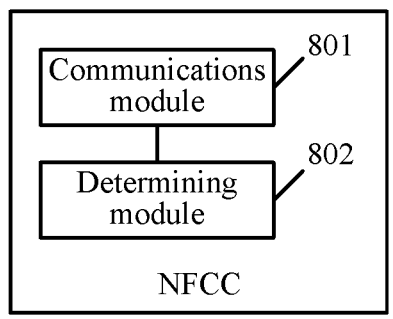
FIG. 8 is a schematic structural diagram of still another NFCC according to an embodiment of the present invention.

Referring to FIG. 8, FIG. 8 is a schematic structural diagram of still another NFCC according to an embodiment of the present invention. The NFCC is an NFCC of a first NFC device. As shown in FIG. 8, the NFCC may include a communications module 801 and a determining module 802.

The communications module 802 is configured to receive an adjustment command that is sent by a DH of the first NFC device and that includes a first length value, where the adjustment command is used to instruct the NFCC to adjust a maximum length value of data packets transmitted in a subsequent communication process, and the maximum length value limits a length of a data packet transmitted in a direction from the first NFC device to a second NFC device and a length of a data packet transmitted in a direction from the second NFC device to the first NFC device.

In this embodiment of the present invention, before the communications module 801 performs corresponding operations, both the first NFC device and the second NFC device already activate a MAC layer, that is, the first NFC device and the second NFC device already obtain, through negotiation by using an ATR_REQ and an ATR_RES, the maximum length value of the data packets transmitted in the subsequent communication process, that is, a second length value and a third length value. The second length value is set by the first NFC device and that is used to limit a length (that is, the length of the data packet transmitted in the direction from the second NFC device to the first NFC device) of a data packet sent by the second NFC device in the subsequent communication process, and the third length value is set by the second NFC device and is used to limit a length (that is, the length of the data packet transmitted in the direction from the first NFC device to the second NFC device) of a data packet sent by the first NFC device in the subsequent communication process. That is, in the subsequent communication, the length of the data packet sent by the second NFC device cannot exceed the second length value, and the length of the data packet sent by the first NFC device cannot exceed the third length value.

The communications module 801 is further configured to: send a first request including the first length value to the second NFC device, and receive a first response that is returned by the second NFC device for the first request, where the first request is used to instruct to adjust the maximum length value of the data packets transmitted between the first NFC device and the second NFC device in the subsequent communication process to the first length value, the first request may further include a first DID, and the first response may include a second DID.

In this embodiment of the present invention, the first request may be a parameter selection request PSL_REQ defined in the Digital specification defined by the NFC forum. The fifth byte (Byte 5) represents an FSL parameter, and a value of the byte defines a maximum length value of a command and a response. Further, values corresponding to the first and second bits (that is, b1 and b2 defined in the Digital specification) in the byte represent the maximum length value. For example, when the values of the two bits are 00b, the maximum length value is 64 bytes; when the values of the two bits are 01b, the maximum length value is 128 bytes; when the values of the two bits are 10b, the maximum length value is 192 bytes; and when the values of the two bits are 11b, the maximum length value is 254 bytes. Therefore, the maximum length value is adjusted by using the PSL_REQ and a PSL_RES. The adjustment may be understood as: The maximum length value is switched (switch) from one length value to another length value, or may be understood as: The maximum length value is obtained through re-negotiation, or modified. This embodiment of the present invention does not limit meaning of "adjusting".

The command and the response may be a command and a response that are used during communication performed by using the NFC-DEP protocol, for example, a DEP_REQ and a DEP_RES. The command and the response may be used as payloads (payload, that is, service data related to an upper-layer application) and are encapsulated into a data packet (Data). Then, the NFC device sends the data packet in a format of an NFC-A technology (that is, the type A radio frequency technology defined in the NFC forum, corresponding to an abbreviation of type A of ISO/IEC 14443) standard frame or in a format of an NFC-F technology (that is, the type F radio frequency technology defined in the NFC forum, corresponding to abbreviations of 212-kbps and 424-kbps communication mechanisms of ISO/IEC 18092) frame. Therefore, the maximum length value may be understood as a maximum value of data packet lengths, or may be understood as a maximum value of quantities of payload (payload) bytes of the command and the response.

In this embodiment of the present invention, the communications module 801 sends the first request including the first length value to the second NFC device, so that the second NFC device does not return any response when the second NFC device does not agree to adjust the maximum length value of the data packets transmitted in the subsequent communication process to the first length value, or the second NFC device returns a response indicating that the second NFC device does not agree to adjust the maximum length value of the data packets transmitted in the subsequent communication process to the first length value, for example, a DID included in the response is not equal to the DID included in the first request, to indicate that the second NFC device does not agree to the first length value, or the second NFC device returns a response indicating that the second NFC device agrees to adjust the maximum length value of the data packets transmitted in the subsequent communication process to the first length value, for example, a device identification number DID included in the response is equal to the DID included in the first request, to indicate that the second NFC device agrees to the first length value.

The determining module 802 is configured to: when the first DID is the same as the second DID, use the first length value as the maximum length value of the data packets transmitted in the subsequent communication.

In this embodiment of the present invention, when the second DID included in the first response is the same as the first DID included in the first request, the first response is used to represent that the second NFC device already adjusts the maximum length value of the data packets transmitted in the subsequent communication process to the first length value. The first DID and the second DID are a device identification number of the second NFC device. For example, for the NFC-DEP protocol, the second DID is an identifier that is allocated, when the first NFC device used as the initiator activates the MAC layer by using the ATR_REQ, by the first NFC device to the second NFC device used as the target and that is used to identify the second NFC device. Further for example, for the ISO-DEP protocol, the second DID is an identifier that is allocated, when a first NFC device used as a reader/writer (Reader/Writer) activates, by using an RATS Command or an ATTRIB Command, a second NFC device used as an NFC tag or card emulation, by the first NFC device to the second NFC device and that is used to identify the second NFC device.

In an optional implementation manner, the communications module 801 may be further configured to send an adjustment response including a status indication and/or the first length value to the DH of the first NFC device, where the status indication is used to represent that the NFCC already adjusts the maximum length value to the first length value, that is, the first NFC device and the second NFC device already complete this adjustment.

Figure 9:
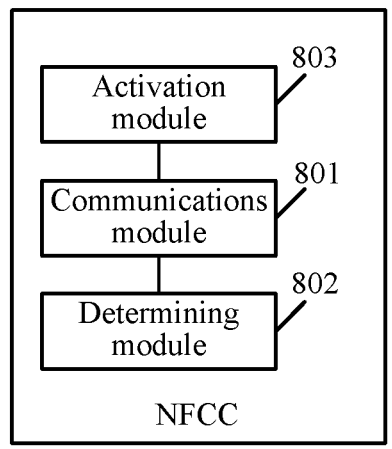
FIG. 9 is a schematic structural diagram of still another NFCC according to an embodiment of the present invention.

In an optional implementation manner, when the communications module 801 may be further configured to send the adjustment response including the status indication and/or the first length value to the DH of the first NFC device, the NFCC may further include a first activation module 803, and the NFCC including the first activation module 803 may be shown in FIG. 9. FIG. 9 is a schematic structural diagram of still another NFCC according to an embodiment of the present invention.

The first activation module 803 is configured to: before the communications module 801 sends the first request including the first length value to the second NFC device, activate a first RF interface.

The communications module 801 may be further configured to send a first notification to the DH of the first NFC device, where the first notification is used to notify the DH of the first NFC device that the first RF interface has been activated.

It should be noted that, in this optional implementation manner, the first NFC device and the second NFC device activate the MAC layer between the first NFC device and the second NFC device by using the ATR_REQ and the ATR_RES, that is, the first NFC device and the second NFC device already obtain, through negotiation, the maximum length value of the data packets transmitted in two directions in the subsequent communication, that is, the second length value and the third length value in the foregoing embodiment. In this embodiment of the present invention, when the NFCC of the first NFC device sends the first notification to the DH of the first NFC device, the first notification may carry a parameter value in the ATR_RES, where the parameter value includes the third length value. For details, refer to the NCI specification.

In an optional implementation manner, when the communications module 801 may be further configured to send the adjustment response including the status indication and/or the first length value to the DH of the first NFC device, and the NFCC includes the first activation module 803, the communications module 801 may be further configured to receive, by using the first RF interface, a first data message sent by the DH of the first NFC device.

Figure 10:
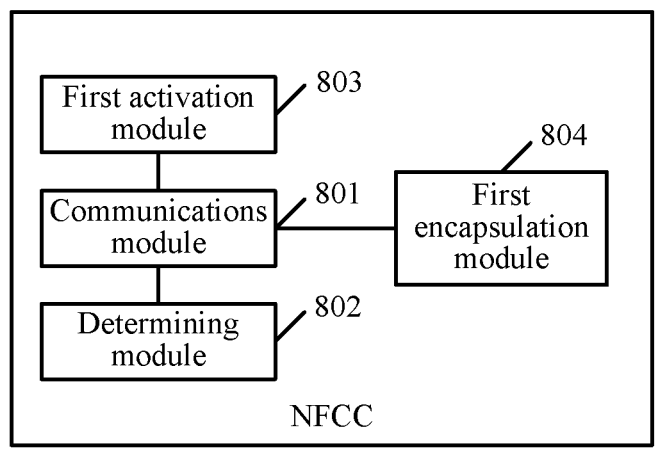
FIG. 10 is a schematic structural diagram of still another NFCC according to an embodiment of the present invention.

In this optional implementation manner, the NFCC may further include a first encapsulation module 804. The NFCC including the first encapsulation module 804 may be shown in FIG. 10. FIG. 10 is a schematic structural diagram of still another NFCC according to an embodiment of the present invention.

The first encapsulation module 804 is configured to encapsulate a payload in the first data message into a first data packet by using the first length value as the maximum length value.

The communications module 801 may be further configured to send the first data packet to the second NFC device.

In another optional implementation manner, when the communications module 801 may be further configured to send the adjustment response including the status indication and/or the first length value to the DH of the first NFC device, the determining module 802 may be further configured to: before the communications module 801 sends the first request including the first length value to the second NFC device, determine that the first length value is less than or equal to the second length value and less than or equal to the third length value.

Figure 11:
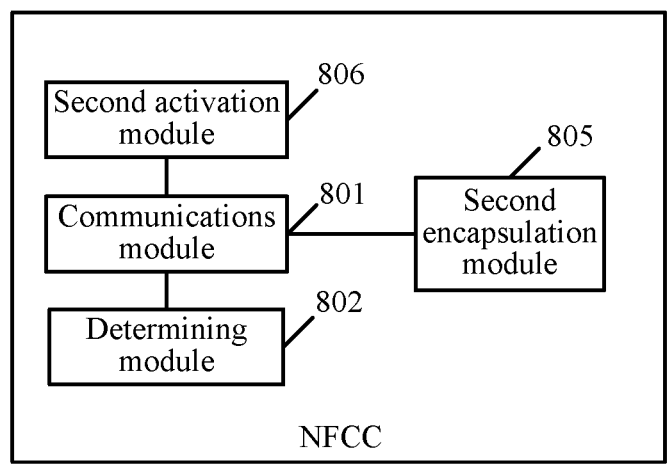
FIG. 11 is a schematic structural diagram of still another NFCC according to an embodiment of the present invention.

In this optional implementation manner, the NFCC further includes a second encapsulation module 805 and a second activation module 806. The NFCC including the second encapsulation module 804 and the second activation module 806 may be shown in FIG. 11. FIG. 11 is a schematic structural diagram of still another NFCC according to an embodiment of the present invention.

The second activation module 806 is configured to activate a second RF interface.

The communications module 801 may be further configured to: send a second notification to the DH of the first NFC device, where the second notification is used to notify the DH of the first NFC device that the second RF interface has been activated; and receive, by using the second RF interface, a second data message sent by the DH of the first NFC device.

The second encapsulation module 805 is configured to encapsulate a payload in the second data message into a second data packet by using the first length value as the maximum length value.

The communications module 801 may be further configured to send the second data packet to the second NFC device.

It should be noted that, in this optional implementation manner, the DH of the first NFC device may send the adjustment command to the NFCC of the first NFC device before or after the NFCC of the first NFC device and the second NFC device directly activate the MAC layer. Because the DH of the first NFC device does not know specific values of the second length value and the third length value that the NFCC of the first NFC device and the second NFC device are to negotiate about or already obtain through negotiation, the first length value in the adjustment command sent by the DH of the first NFC device may be greater than, equal to, or less than the second length value or the third length value. Then, in order to avoid that the first length value exceeds the second length value or the third length value, the NFCC of the first NFC device needs to perform the foregoing operations, to ensure that the first length value is less than or equal to the second length value and the third length value.

It should be noted that, in this embodiment of the present invention, the second notification may or may not include the first length value. The first data message, the second data message, the first data packet, and the second data packet are respectively the same as the data message and the data packet in the foregoing embodiments, and details are not described herein again.

Optionally, the first request may be a PSL_REQ defined in the Digital specification, the first response may be a PSL_RES defined in the Digital specification, the first RF interface and the second RF interface may be NFC-DEP radio frequency interfaces defined in the NCI specification, and the first notification and the second notification may be radio frequency interface-activated notifications RF_INT- F_ACTIVATED_NTFs defined in the NCI specification. This is not limited in this embodiment of the present invention.

Optionally, the first request may also be an RATS Command or an ATTRIB Command that is defined in the Digital specification and that is applicable to the ISO-DEP protocol, and an included FSDI (Frame Size for proximity coupling Device Integer) parameter is used to calculate a maximum length value FSD of a data packet (for example, an information block I-block or a payload payload of the I-block) that can be received by an NFC device (for example, a reader/writer) working in a poll (poll) mode. Correspondingly, the first response may also be an RATS Response or an ATTRIB Response defined in the Digital specification, and an FSCI (Frame Size for proximity Card Integer) parameter that may be included is used to calculate a maximum length value FSC of a data packet (for example, an information block I-block or a payload payload of the I-block) that can be received by an NFC device (for example, an NFC tag or card emulation) working in a poll mode. The first RF interface may be an ISO-DEP radio frequency interface or an NDEF radio frequency interface defined in the NCI specification, and the first notification and the second notification may be RF_INTF_ACTIVATED_NTFs defined in the NCI specification. In this case, in addition to the original meaning, the "adjusting" used in the solutions of the present invention may be understood as negotiation, limitation, or the like. This is not limited in this embodiment of the present invention.

As can be seen, this embodiment of the present invention can implement, by using the NCI specification, a function that an NFCC of a first NFC device used as an initiator and a second NFC device used as a target adjust a maximum length value of communication data packets in a subsequent communication process.

Figure 12:
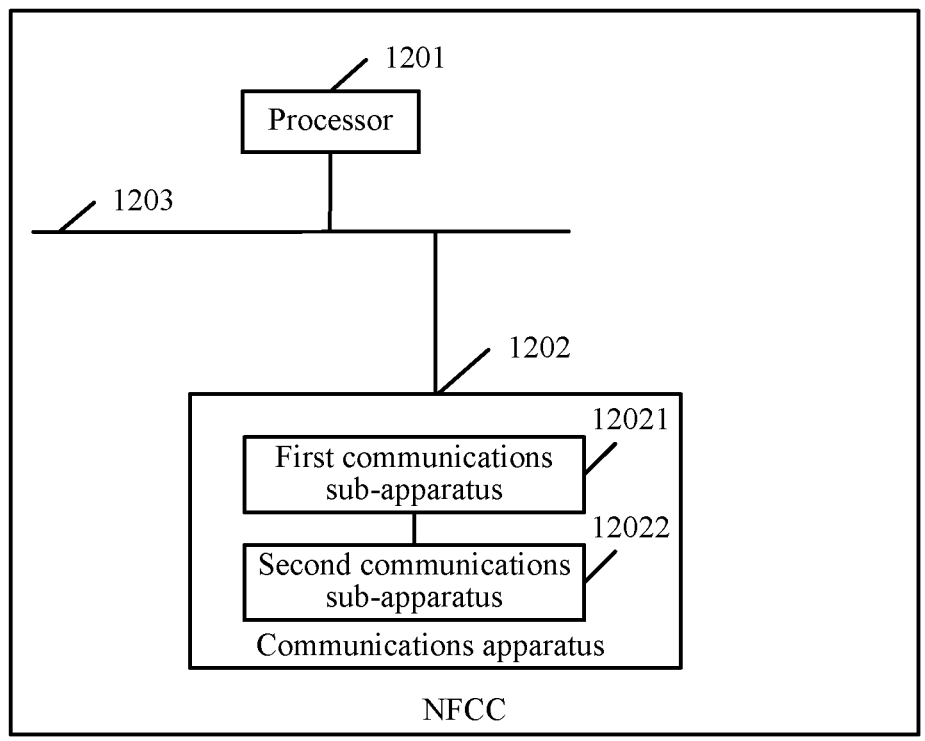
FIG. 12 is a schematic structural diagram of still another NFCC according to an embodiment of the present invention.

Referring to FIG. 12, FIG. 12 is a schematic structural diagram of still another NFCC according to an embodiment of the present invention. As shown in FIG. 12, the NFCC may include at least one processor 1201, for example, a CPU, a communications apparatus 1202, and at least one communications bus 1203. Both a first NFC device and a second NFC device already activate a MAC layer, that is, the first NFC device and the second NFC device already obtain, through negotiation by using an ATR_REQ and an ATR_RES, a maximum length value of data packets transmitted in a subsequent communication process, that is, a second length value and a third length value. The second length value is set by the first NFC device and that is used to limit a length (that is, a length of a data packet transmitted in a direction from the second NFC device to the first NFC device) of a data packet sent by the second NFC device in the subsequent communication process, and the third length value is set by the second NFC device and is used to limit a length (that is, a length of a data packet transmitted in a direction from the first NFC device to the second NFC device) of a data packet sent by the first NFC device in the subsequent communication process. That is, in the subsequent communication, the length of the data packet sent by the second NFC device cannot exceed the second length value, and the length of the data packet sent by the first NFC device cannot exceed the third length value.

The communications bus 1203 is configured to implement connection and communication between these components.

In an embodiment, the processor 1201 is configured to determine whether the NFCC is responsible for determining the maximum length value of the data packets transmitted in the subsequent communication.

The communications apparatus 1202 is configured to: when a determining result of the processor 1201 is yes, send a first request including a first length value to the second NFC device, and receive a first response that is returned by the second NFC device for the first request, where the first request is used to instruct to adjust the maximum length value of the data packets transmitted between the first NFC device and the second NFC device in the subsequent communication to the first length value, the first length value is a value determined by the NFCC, the maximum length value limits the length of the data packet transmitted in the direction from the first NFC device to the second NFC device and the length of the data packet transmitted in the direction from the second NFC device to the first NFC device, the first request may further include a first DID, and the second response includes a second DID.

Specifically, as shown in FIG. 12, the communications apparatus 1202 may include a first communications sub-apparatus 12021, configured to communicate with the second NFC device (that is, send data to the second NFC device and receive data from the second NFC device), for example, a transceiver circuit of the NFCC. A working frequency of an NFC antenna in the transceiver circuit may be 13.56 MHz. The NFCC may send data to the second NFC device by using the NFC antenna, and may receive data from the second NFC device by using the NFC antenna. In this embodiment of the present invention, the communications apparatus 1202 may send the first request including the first length value to the second NFC device by using the first communications sub-apparatus 12021, and receive, by using the first communications sub-apparatus 12021, the first response that is returned by the second NFC device for the first request.

The processor 1201 is further configured to: when the first DID is the same as the second DID, use the first length value as the maximum length value of the data packets transmitted in the subsequent communication.

In an optional implementation manner, a specific manner of determining, by the processor 1201, whether the NFCC is responsible for determining the maximum length value of the data packets transmitted in the subsequent communication is:

determining whether a value of a first parameter is a first specific value, where the first specific value is used to represent that the NFCC is responsible for determining the maximum length value of the data packets transmitted in the subsequent communication, and the value of the first parameter is a default value of the NFCC (that is, the value may be understood as a default value set in the NFCC when an NFC chip is at delivery), or a value configured by a DH of the first NFC device for the NFCC.

In an optional implementation manner, the communications apparatus 1202 may be further configured to: send a first notification including the first length value to the DH of the first NFC device, where the first notification is used to notify the DH of the first NFC device that a first RF interface has been activated; and receive, by using the first RF interface, a data message sent by the first NFC device. The processor 1201 may be further configured to encapsulate a payload in the data message into a data packet by using the first length value as the maximum length value. The communications apparatus 1202 is further configured to send the data packet to the second NFC device by using the first communications sub-apparatus 12021.

In this optional implementation manner, an objective of sending, by the communications apparatus 1202, the first notification including the first length value to the DH of the first NFC device is to: report, to the DH of the first NFC device, that the adjusted maximum length value of the data packets transmitted between the first NFC device and the second NFC device in the subsequent communication are the first length value, so that after obtaining the first length value, the DH of the first NFC device may use the first length value in an upper layer service, for example, the DH of the first NFC device estimates time required for transmitting data related to the upper layer service in this communication; and notify the DH of the first NFC device that the first RF interface has been activated, that is, the NFCC of the first NFC device has prepared for receiving the data message sent by the DH of the first NFC device. The data message may be Data Message(s) defined in the NCI specification. The Data Message(s) are transmitted between the DH and the NFCC by means of transmission of Data Packet(s), and payloads (payload) in the data message(s) may carry the data related to the upper layer service.

Specifically, as shown in FIG. 12, the communications apparatus 1202 may further include a second communications sub-apparatus 12022, configured to communicate with the DH of the first NFC device, for example, an interface between the DH and the NFCC. The interface may support the NCI protocol at an upper layer, and may transmit data by using a universal asynchronous receiver/transmitter (UART, Universal Asynchronous Receiver/Transmitter), an I2C bus (Inter-Integrated Circuit), or a serial peripheral interface (SPI, Serial Peripheral Interface) at a bottom layer. In this embodiment of the present invention, the communications apparatus 1202 may send the first notification including the first length value to the DH of the first NFC device by using the second communications sub-apparatus 12022, and receive, by using the second communications sub-apparatus 12022, the data message sent by the DH, that is, the first RF interface may be understood as the second communications sub-apparatus 12022.

It should be noted that, in this embodiment of the present invention, the data message and the data packet are respectively the same as the data message and the data packet described in the foregoing embodiment, and details are not described herein again.

Optionally, the first request may be a PSL_REQ defined in the Digital specification, the first response may be a PSL_RES defined in the Digital specification, the first RF interface may be an NFC-DEP radio frequency interface defined in the NCI specification, and the first notification may be a radio frequency interface-activated notification RF_INTF_ACTIVATED_NTF defined in the NCI specification. This is not limited in this embodiment of the present invention.

Optionally, the first request may also be an RATS Command or an ATTRIB Command that is defined in the Digital specification and that is applicable to the ISO-DEP protocol, and an included FSDI (Frame Size for proximity coupling Device Integer) parameter is used to calculate a maximum length value FSD of a data packet (for example, an information block I-block or a payload payload of the I-block) that can be received by an NFC device (for example, a reader/writer) working in a poll (poll) mode. Correspondingly, the first response may also be an RATS Response or an ATTRIB Response defined in the Digital specification, and an FSCI (Frame Size for proximity Card Integer) parameter that may be included is used to calculate a maximum length value FSC of a data packet (for example, an information block I-block or a payload payload of the I-block) that can be received by an NFC device (for example, an NFC tag or card emulation) working in a poll mode. The first RF interface may be an ISO-DEP radio frequency interface or an NDEF radio frequency interface defined in the NCI specification, and the first notification may be an RF_INTF_ACTIVATED_NTF defined in the NCI specification. In this case, in addition to the original meaning, the "adjusting" used in the solutions of the present invention may be understood as negotiation, limitation, or the like. This is not limited in this embodiment of the present invention.

In another embodiment, the communications apparatus 1202 is configured to receive an adjustment command that is sent by a DH of the first NFC device and that includes a first length value, where the adjustment command is used to instruct the NFCC to adjust the maximum length value of the data packets transmitted in the subsequent communication process.

Specifically, the communications apparatus 1202 may include a second communications sub-apparatus 12022, configured to communicate with the DH of the first NFC device, for example, an interface between the DH and the NFCC. The interface may support the NCI protocol at an upper layer, and may transmit data by using a universal asynchronous receiver/transmitter (UART, Universal Asynchronous Receiver/Transmitter), an I2C bus (Inter-Integrated Circuit), or a serial peripheral interface (SPI, Serial Peripheral Interface) at a bottom layer. In this embodiment of the present invention, the communications apparatus 1202 may receive, by using the second communications sub-apparatus 12022, the adjustment command that is sent by the DH of the first NFC device and that includes the first length value.

The communications apparatus 1202 is further configured to: send a first request including the first length value to the second NFC device, and receive a first response that is returned by the second NFC device for the first request, where the first request is used to instruct to adjust the maximum length value of the data packets transmitted between the first NFC device and the second NFC device in the subsequent communication process to the first length value, the first request may further include a first DID, and the first response further includes a second DID.

Specifically, the communications apparatus 1202 may further include a first communications sub-apparatus 12021, configured to communicate with the second NFC device (that is, send data to the second NFC device and receive data from the second NFC device), for example, a transceiver circuit of the NFCC. A working frequency of an NFC antenna in the transceiver circuit may be 13.56 MHz. The NFCC may send data to the second NFC device by using the NFC antenna, and may receive data from the second NFC device by using the NFC antenna. In this embodiment of the present invention, after receiving the adjustment command that is sent by the DH of the first NFC device and that includes the first length value, the communications apparatus 1202 may send the first request including the first length value to the second NFC device by using the first communications sub-apparatus 12021, and receive, by using the first communications sub-apparatus 12021, the first response that is returned by the second NFC device for the first request.

The processor 1201 is configured to: when the first DID is the same as the second DID, use the first length value as the maximum length value of the data packets transmitted in the subsequent communication.

In an optional implementation manner, the communications apparatus 1202 may be further configured to send an adjustment response including a status indication and/or the first length value to the DH of the first NFC device by using the second communications sub-apparatus 12022, where the status indication is used to represent that the NFCC already adjusts the maximum length value to the first length value.

In an optional implementation manner, when the communications apparatus 1202 may be further configured to send the adjustment response including the status indication and/or the first length value to the DH of the first NFC device by using the second communications sub-apparatus 12022, the processor 1201 may be further configured to: before the first communications sub-apparatus 12021 of the communications apparatus 1202 sends the first request including the first length value to the second NFC device, activate a first RF interface. The communications apparatus 1202 may be further configured to send a first notification to the DH of the first NFC device, where the first notification is used to notify the DH that the first RF interface has been activated. Specifically, the communications apparatus 1202 may send the first notification to the DH of the first NFC device by using the second communications sub-apparatus 12022.

In this optional implementation manner, further optionally, the communications apparatus 1202 may be further configured to receive, by using the first RF interface, the first data message sent by the DH of the first NFC device. The processor 1201 may be further configured to encapsulate a payload in the first data message into a first data packet by using the first length value as the maximum length value. The communications apparatus 1202 may be further configured to send the first data packet to the second NFC device by using the first communications sub-apparatus 12021.

In another optional implementation manner, when the communications apparatus 1202 may be further configured to send the adjustment response including the status indication and/or the first length value to the DH of the first NFC device by using the second communications sub-apparatus 12022, the processor 1201 may be further configured to: before the first communications sub-apparatus 12021 of the communications apparatus 1202 sends the first request including the first length value to the second NFC device, determine that the first length value is less than or equal to the second length value and less than or equal to the third length value.

In this optional implementation manner, further optionally, the communications apparatus 1202 may be further configured to: send a second notification to the DH of the first NFC device by using the second communications sub-apparatus 12022, where the second notification is used to notify the DH of the first NFC device that the second RF interface has been activated; and receive, by using the second RF interface, a second data message sent by the DH of the first NFC device. The processor 1201 is further configured to encapsulate a payload in the second data message into a second data packet by using the first length value as the maximum length value. The communications apparatus 1202 may be further configured to send the second data packet to the second NFC device by using the first communications sub-apparatus 12021.

It should be noted that, in this embodiment of the present invention, the second notification may or may not include the first length value. The first data message, the second data message, the first data packet, and the second data packet are respectively the same as the data message and the data packet in the foregoing embodiments, and details are not described herein again. Optionally, the first request may be a PSL_REQ defined in the Digital specification, the first response may be a PSL_RES defined in the Digital specification, the first RF interface and the second RF interface may be NFC-DEP radio frequency interfaces defined in the NCI specification, and the first notification and the second notification may be radio frequency interface-activated notifications RF_INTF_ACTIVATED_NTFs defined in the NCI specification. This is not limited in this embodiment of the present invention.

Optionally, the first request may also be an RATS Command or an ATTRIB Command that is defined in the Digital specification and that is applicable to the ISO-DEP protocol, and an included FSDI (Frame Size for proximity coupling Device Integer) parameter is used to calculate a maximum length value FSD of a data packet (for example, an information block I-block or a payload payload of the I-block) that can be received by an NFC device (for example, a reader/writer) working in a poll (poll) mode. Correspondingly, the first response may also be an RATS Response or an ATTRIB Response defined in the Digital specification, and an FSCI (Frame Size for proximity Card Integer) parameter that may be included is used to calculate a maximum length value FSC of a data packet (for example, an information block I-block or a payload payload of the I-block) that can be received by an NFC device (for example, an NFC tag or card emulation) working in a poll mode. The first RF interface and the second RF interface may be ISO-DEP radio frequency interfaces or NDEF radio frequency interfaces defined in the NCI specification, and the first notification and the second notification may be RF_INTF_ACTIVATED_NTFs defined in the NCI specification. In this case, in addition to the original meaning, the "adjusting" used in the solutions of the present invention may be understood as negotiation, limitation, or the like. This is not limited in this embodiment of the present invention.

As can be seen, this embodiment of the present invention can implement, by using the NCI specification, a function that an NFCC of a first NFC device used as an initiator and a second NFC device used as a target adjust a maximum length value of communication data packets in a subsequent communication process.

Figure 13:
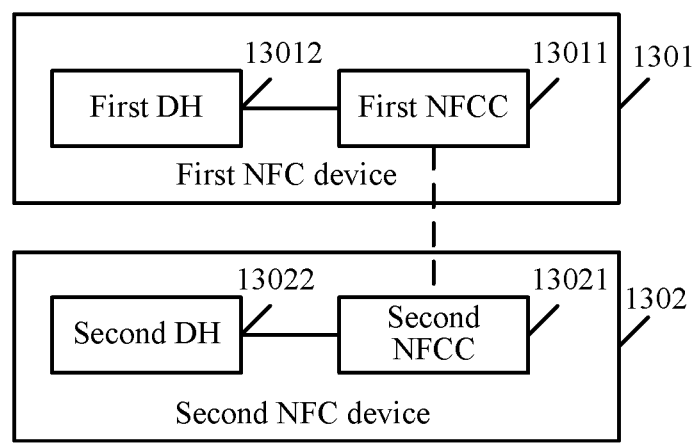
FIG. 13 is a schematic structural diagram of a system for adjusting a data packet length in near field communication NFC according to an embodiment of the present invention.

Referring to FIG. 13, FIG. 13 is a schematic flowchart of a system for adjusting a data packet length in near field communication NFC according to an embodiment of the present invention. As shown in FIG. 13, the system may include a first NFC device 1301 used as an initiator and a second NFC device 1302 used as a target. The first NFC device 1301 may include a first NFCC 13011 and a first DH 13012. The second NFC device may include a second NFCC 13021 and a second DH 13022. Both the first NFC device 1301 and the second NFC device 1302 already activate a MAC layer. That is, the first NFC device 1301 and the second NFC device 1302 already obtain, through negotiation by using an ATR_REQ and an ATR_RES, a maximum length value of data packets transmitted in a subsequent communication process, that is, a second length value and a third length value. The second length value is a length that is set by the first NFC device 1301 and that is used to limit a length of a data packet sent by the second NFC device 1302 in the subsequent communication process, and the third length is a length that is set by the second NFC device 1302 and that is used to limit a length of a data packet sent by the first NFC device 1301 in the subsequent communication process.

In an embodiment, the first NFCC 13011 is configured to determine whether the first NFCC 13011 is responsible for determining the maximum length value of the data packets transmitted in the subsequent communication; if yes, send a first request including the first length value to the second NFCC 13021 of the second NFC device 1302. The first request is used to instruct to adjust the maximum length value of the data packets transmitted between the first NFC device 1301 and the second NFC device 1302 in the subsequent communication to the first length value, the first length value is a value determined by the first NFCC 13011, and the first request may further include a first DID.

The second NFCC 13021 is configured to: determine whether the second NFCC 13021 is responsible for responding to the first request; when a determining result is yes, send a first response for the first request to the first NFCC 13011; when the determining result is no, activate a first RF interface of the second NFC device 1302, and send a first notification including the first length value to the second DH 13022.

The second DH 13022 is configured to: when receiving the first notification, determine whether the first length value in the first notification is less than or equal to the second length value and less than or equal to the third length value, and when a determining result is yes, return a second response to the second NFCC 13021.

The second NFCC 13021 is further configured to: after receiving the second response, send the second response to the first NFCC 13011.

The first NFCC 13011 is further configured to: when receiving the response returned by the second NFCC 13021, and a second DID included in the response is the same as the first DID included in the first request, use the first length value as the maximum length value of the data packets transmitted between the first NFC device 1301 and the second NFC device 1302 in the subsequent communication, where the response is the first response or the second response.

In an optional implementation manner, a specific manner of determining, by the first NFCC 13011, whether the first NFCC 13011 is responsible for determining the maximum length value of the data packets transmitted in the subsequent communication may be:

determining whether a value of a first parameter is a first specific value, where the first specific value is used to represent that the first NFCC 13011 is responsible for determining the maximum length value of the data packets transmitted in the subsequent communication, and the value of the first parameter is a default value of the first NFCC 13011 (that is, the value may be understood as a default value set in the NFCC when an NFC chip is at delivery), or a value configured by the first DH 13012 for the first NFCC 13011. This is not limited in this embodiment of the present invention.

In an optional implementation manner, the first NFCC 13011 may be further configured to: after the first length value is used as the maximum length value of the data packets transmitted between the first NFC device 1301 and the second NFC device 1302 in the subsequent communication, send a second notification including the first length value to the first DH 13012, where the second notification is used to notify the first DH 13012 that a second RF interface of the first NFC device 1301 has been activated, receive, by using the second RF interface, a data message sent by the first DH 13012, encapsulate a payload in the data message into a data packet by using the first length value as the maximum length value, and send the data packet to the second NFCC 1321 of the second NFC device 1302. A length value of the data packet is less than or equal to the third length value.

In this optional implementation manner, an objective of sending, by the first NFCC 13011, the second notification including the first length value to the first DH 13012 is to: report, to the first DH 13012, that the adjusted maximum length value of the data packets transmitted between the first NFC device 1301 and the second NFC device 1302 in the subsequent communication are the first length value, so that after obtaining the first length value, the first DH 13012 may use the first length value in an upper layer service, for example, the DH of the first NFCC estimates time required for transmitting data related to the upper layer service in this communication; and notify the first DH 13012 that the second RF interface has been activated, that is, the first NFCC 13011 has prepared for receiving the data message sent by the first DH 13012. The data message may be Data Message(s) defined in the NCI specification. The Data Message(s) are transmitted between the first DH 13012 and the first NFCC 13011 by means of transmission of Data Packet(s), and payloads (payload) in the data message(s) may carry the data related to the upper layer service.

In an optional implementation manner, a specific manner of determining, by the second NFCC 13021, whether the second NFCC 13021 is responsible for responding to the first request may be:

determining whether a value of a second parameter in the second NFCC 13021 is a second specific value, where the second specific value is used to represent that the second NFCC 13021 is responsible for responding to the first request, and the second specific value may be a default value of the second NFCC 13021 (that is, the value may be understood as a default value set in the NFCC when an NFC chip is at delivery), or may be a value configured by the second DH 13022 for the second NFCC 13021. This is not limited in this embodiment of the present invention.

In an optional implementation manner, the second NFCC 13021 may be further configured to: after sending the first response for the first request to the first NFCC 13011 and when a first DID included in the first response is the same as a second DID included in the first request, send the first length value to the second DH 13022 by using a third notification.

It should be noted that, in this embodiment of the present invention, the data message and the data packet are respectively the same as the data message and the data packet described in the foregoing embodiment, and details are not described herein again.

Optionally, the first request may be a PSL_REQ defined in the Digital specification, the first response and the second response may be PSL_RESs defined in the Digital specification, the first RF interface and the second RF interface may be NFC-DEP radio frequency interfaces defined in the NCI specification, and the first notification, the second notification, and the third notification may be RF_INTF_ACTIVATED_NTFs defined in the NCI specification. This is not limited in this embodiment of the present invention.

Optionally, the first request may be an RATS Command or an ATTRIB Command defined in the Digital specification, the first response and the second response may be RATS Responses or ATTRIB Responses defined in the Digital specification, the first RF interface and the second RF interface may be ISO-DEP radio frequency interfaces or NDEF radio frequency interfaces defined in the NCI specification, and the first notification, the second notification, and the third notification may be RF_INTF_ACTIVATED_NTFs defined in the NCI specification. This is not limited in this embodiment of the present invention.

In another embodiment, the first NFCC 13011 is configured to: receive an adjustment command that is sent by the first DH 13012 and that includes a first length value, where the adjustment command is used to instruct the first NFCC 13011 to adjust the maximum length value of the data packets transmitted in the subsequent communication process, and if yes, send a first request including the first length value to the second NFCC 13021, where the first request is used to instruct to adjust the maximum length value of the data packets transmitted between the first NFC device 1301 and the second NFC device 1302 in the subsequent communication to the first length value, and the first request may further include a first DID.

The second NFCC 13021 is configured to: determine whether the second NFCC 13021 is responsible for responding to the first request; when a determining result is yes, send a first response for the first request to the first NFCC 13011; when the determining result is no, activate a first RF interface of the second NFC device 1302, and send a first notification including the first length value to the second DH 13022.

The second DH 13022 is configured to: when receiving the first notification, determine whether the first length value in the first notification is less than or equal to the second length value and less than or equal to the third length value, and when a determining result is yes, return a second response to the second NFCC 13021.

The second NFCC 13021 is further configured to: after receiving the second response, send the second response to the first NFCC 13011.

The first NFCC 13011 is further configured to: when receiving the response returned by the second NFCC 13021, and a second DID included in the response is the same as the first DID included in the first request, use the first length value as the maximum length value of the data packets transmitted between the first NFC device 1301 and the second NFC device 1302 in the subsequent communication, where the response is the first response or the second response.

In an optional implementation manner, the first NFCC 13011 may be further configured to: after the first length value is used as the maximum length value of the data packets transmitted in the subsequent communication process, send an adjustment response including a status indication and/or the first length value to the first DH 13012, where the status indication is used to indicate that the first NFCC 13011 already adjusts the maximum length value to the first length value.

In an optional implementation manner, when the first NFCC 13011 may be further configured to: after the first length value is used as the maximum length value of the data packets transmitted in the subsequent communication process, send the adjustment response including the status indication and/or the first length value to the first DH 13012, the first NFCC 13011 may be further configured to: before receiving the adjustment command that is sent by the first DH 13012 and that includes the first length value, activate a second RF interface of the first NFC device 1301, and send a second notification to the first DH 13011, where the second notification is used to notify the first DH 13011 that the second RF interface has been activated.

In this optional implementation manner, further optionally, the first NFCC 13011 may be further configured to: receive, by using the second RF interface, a first data message sent by the first DH 13012, encapsulate a payload in the first data message into a first data packet by using the first length value as the maximum length value, and send the first data packet to the second NFCC 13022 of the second NFC device 1302, where a length value of the first data packet is less than or equal to the first length value.

In another optional implementation manner, the first NFCC 13011 may be further configured to: before sending the first request the second NFCC 13021, determine that the first length value is less than or equal to the second length value and less than or equal to the third length value.

In this optional implementation manner, further optionally, the first NFCC 13011 may be further configured to: send a third notification to the first DH 13012, where the third notification is used to notify the first DH 13012 that a third RF interface has been activated, receive, by using the third RF interface, a second data message sent by the first DH 13012, encapsulate a payload in the second data message into a second data packet by using the first length value as the maximum length value, and send the second data packet to the second NFCC 13021 of the second NFC device 1302. A length value of the second data packet is less than or equal to the first length value.

In an optional implementation manner, a specific manner of determining, by the second NFCC 13021, whether the second NFCC 13021 is responsible for responding to the first request may be:

determining whether a value of a first parameter in the second NFCC 13021 is a first specific value, where the first specific value is used to represent that the second NFCC 13021 is responsible for responding to the first request, and the second specific value may be a default value of the second NFCC 13021 (that is, the value may be understood as a default value set in the NFCC when an NFC chip is at delivery), or may be a value configured by the second DH 13022 for the second NFCC 13021. This is not limited in this embodiment of the present invention.

It should be noted that, the first parameter and the first specific value in this embodiment of the present invention may be different from the first parameter and the first specific value in the foregoing embodiment of the present invention. In addition, the third notification may or may not include the first length value. The first data message, the second data message, the first data packet, and the second data packet are respectively the same as the data message and the data packet in the foregoing embodiments, and details are not described herein again.

In an optional implementation manner, the second NFCC 13021 may be further configured to: after sending the first response for the first request to the first NFCC 13011 and when the second DID included in the first response is the same as the first DID included in the first request, send the first length value to the second DH 13022 by using a fourth notification.

In an optional implementation manner, the first request may be a PSL_REQ defined in the Digital specification, the first response and the second response may be PSL_RESs defined in the Digital specification, the first RF interface, the second RF interface, and the third RF interface may be NFC-DEP radio frequency interfaces defined in the NCI specification, and the first notification, the second notification, the third notification, and the fourth notification may be RF_INTF_ACTIVATED_NTFs defined in the NCI specification. This is not limited in this embodiment of the present invention.

In another optional implementation manner, the first request may be an RATS Command or an ATTRIB Command defined in the Digital specification, the first response and the second response may be RATS Responses or ATTRIB Responses defined in the Digital specification, the first RF interface, the second RF interface, and the third RF interface may be ISO-DEP radio frequency interfaces or NDEF radio frequency interfaces defined in the NCI specification, and the first notification, the second notification, the third notification, and the fourth notification may be RF_INTF_ACTIVATED_NTFs defined in the NCI specification. This is not limited in this embodiment of the present invention.

As can be seen, this embodiment of the present invention can implement, by using the NCI specification, a function that an NFCC of a first NFC device used as an initiator and a second NFC device used as a target adjust a maximum length value of communication data packets in a subsequent communication process. It should be noted that, in the foregoing embodiments, the descriptions of the embodiments have respective focuses. For a part that is not described in detail in an embodiment, reference may be made to related descriptions in other embodiments. In addition, a person skilled in the art should also appreciate that all the embodiments described in the specification are an example embodiments, and the related actions and modules are not necessarily mandatory to the present invention.

A sequence of the steps of the method in the embodiments of the present invention may be adjusted, and certain steps may also be merged or removed according to an actual need.

Merging, division, and removing may be performed on the modules in the NFCC in the embodiments of the present invention according to an actual need.

The modules of the embodiments of the present invention may be executed by a universal integrated circuit, such as a CPU (Central Processing Unit, central processing unit) or an ASIC (Application Specific Integrated Circuit, application specific integrated circuit).

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), or a random access memory (Random Access Memory, RAM).

The foregoing describes in detail the method for adjusting a data packet length in near field communication NFC, the apparatus, and the system that are disclosed in the embodiments of the present invention. In this specification, specific examples are used to describe the principle and implementation manners of the present invention, and the descriptions of the embodiments are only intended to help understand the present invention and the core idea of the present invention. Meanwhile, a person of ordinary skill in the art may, based on the idea of the present invention, make modifications with respect to the specific implementation manners and the application scope. Therefore, the content of this specification shall not be construed as a limitation to the present invention.

What is claimed is:

1. A method for adjusting a data packet length in near field communication (NFC), wherein the method comprises:
   determining, by an NFC controller (NFCC) of a first NFC device, whether the NFCC is responsible for determining a maximum length value of data packets transmitted in subsequent communication;
   sending, by the NFCC, a first request comprising a first length value and a first device identification number (DID) to a second NFC device when the NFCC is responsible for determining the maximum length value of the data packets transmitted in the subsequent communication, wherein the first request is used to adjust the maximum length value of the data packets transmitted between the first NFC device and the second NFC device in the subsequent communication to the first length value, and wherein the first length value is a value determined by the NFCC;

receiving, by the NFCC from the second NFC device, a first response for the first request, wherein the first response comprises a second DID; and using, by the NFCC, the first length value as the maximum length value of the data packets transmitted in the subsequent communication when the first DID is the same as the second DID;

wherein the method further comprises:

not sending, by the NFCC, the first request comprising the first length value to the second NFC device when the NFCC is not responsible for determining the maximum length value of the data packets transmitted in the subsequent communication.

2. The method of claim 1, wherein determining whether the NFCC is responsible for determining the maximum length value of the data packets transmitted in the subsequent communication comprises determining whether a value of a first parameter is a first specific value, wherein the first specific value is used to represent that the NFCC is responsible for determining the maximum length value of the data packets transmitted in the subsequent communication, and wherein the value of the first parameter is a default value of the NFCC.

3. The method of claim 2, wherein the method further comprises:

sending, by the NFCC, a first notification comprising the first length value to a device host (DH), wherein the first notification is used to notify the DH that a first radio frequency (RF) interface has been activated;

receiving, by the NFCC using the first RF interface, a data message from the DH;

encapsulating a payload in the data message into a data packet using the first length value as the maximum length value; and sending, by the NFCC, the data packet to the second NFC device.

4. The method of claim 1, wherein the method further comprises:

sending, by the NFCC, a first notification comprising the first length value to a device host (DH) of the first NFC device, wherein the first notification is used to notify the DH that a first radio frequency (RF) interface has been activated;

receiving, by the NFCC using the first RF interface, a data message from the DH;

encapsulating a payload in the data message into a data packet using the first length value as the maximum length value; and sending, by the NFCC, the data packet to the second NFC device.

5. The method of claim 4, wherein the first request is a parameter selection request (PSLREQ) defined in a Digital specification, wherein the first response is a parameter selection response (PSL RES) defined in the Digital specification, wherein the first RF interface is a NFC Data Exchange Protocol (NFC-DEP) radio frequency interface defined in a NFC controller interface (NCI) specification, and wherein the first notification is a radio frequency interface-activated notification (RF_INTFACTIVATED NTF) defined in the NCI specification.

6. The method of claim 1, wherein determining whether the NFCC is responsible for determining the maximum length value of the data packets transmitted in the subsequent communication comprises determining whether a value of a first parameter is a first specific value, wherein the first specific value is used to represent that the NFCC is responsible for determining the maximum length value of the data packets transmitted in the subsequent communication, and wherein the value of the first parameter is configured by a device host (DH) of the first NFC device for the NFCC.

7. A method for adjusting a data packet length in near field communication (NFC), wherein the method comprises:

activating, by a NFC controller (NFCC) of a first NFC device, a first radio frequency (RF) interface;

sending, by the NFCC, a first notification to a device host (DH) of the first NFC device, wherein the first notification is used to notify the DH that the first RF interface has been activated;

after transmission of the first notification, receiving, by the NFCC, an adjustment command from the DH and that comprises a first length value, wherein the adjustment command is used to instruct the NFCC to adjust a maximum length value of data packets transmitted in a subsequent communication process;

sending, by the NFCC, a first request comprising the first length value to a second NFC device, wherein the first request is used to instruct to adjust the maximum length value of the data packets transmitted between the first NFC device and the second NFC device in the subsequent communication process to the first length value, and wherein the first request further comprises a first device identification number (DID);

receiving, by the NFCC, a first response from the second NFC device for the first request, wherein the first response comprises a second DID;

using, by the NFCC, the first length value as the maximum length value of the data packets transmitted in the subsequent communication when the first DID is the same as the second DID; and sending, by the NFCC, an adjustment response comprising at least one of: a status indication or the first length value to the DH, wherein the status indication is used to represent that the NFCC already adjusts the maximum length value to the first length value.

8. The method of claim 7, wherein before the sending the first request comprising the first length value to the second NFC device, the method further comprises determining, by the NFCC, that the first length value is less than or equal to a second length value and less than or equal to a third length value.

9. The method of claim 8, wherein the method further comprises:

sending, by the NFCC, a second notification to the DH, wherein the second notification is used to notify the DH that a second RF interface has been activated;

receiving, by the NFCC using the second RF interface, a second data message from the DH;

encapsulating a payload in the second data message into a second data packet using the first length value as the maximum length value; and sending, by the NFCC, the second data packet to the second NFC device.

10. The method of claim 7, wherein the method further comprises: receiving, by the NFCC using the first RF interface, a first data message from the DH;
encapsulating a payload in the first data message into a first data packet using the first length value as the maximum length value; and
sending, by the NFCC, the first data packet to the second NFC device.

11. The method of claim 7, wherein the first request is a parameter selection request (PSL_REQ) defined in a Digital specification, wherein the first response is a parameter selection response (PSLRES) defined in the Digital specification, wherein the first RF interface is a NFC Data Exchange Protocol (NFC-DEP) radio frequency interface defined in a NFC controller interface (NCI) specification, and wherein the first notification is a radio frequency interface-activated notification (RFINTF ACTIVATED NTF) defined in the NCI specification.

12. A near field communication controller (NFCC), comprising:
a processor configured to activate a first radio frequency (RF) interface; and
a communication interface coupled to the processor and configured to:
send a first notification to a device host (DH) of a first near field communication (NFC) device, wherein the first notification is used to notify the DH that the first RF interface has been activated;
after the transmission of the first notification, receive an adjustment command from the DH, wherein the adjustment command comprises a first length value and is used to instruct the NFCC to adjust a maximum length value of data packets transmitted in a subsequent communication process;
send, to a second NFC device, a first request comprising the first length value and a first device identification number (DID), wherein the first request is used to instruct to adjust the maximum length value of the data packets transmitted between the first NFC device and the second NFC device in the subsequent communication process to the first length value;
receive a first response for the first request from the second NFC device, wherein the first response comprises a second DID; and
send an adjustment response comprising at least one of: a status indication or the first length value to the DH, wherein the status indication is used to represent that the NFCC already adjusts the maximum length value to the first length value,
wherein the processor is further configured to use the first length value as the maximum length value of the data packets transmitted in the subsequent communication when the first DID is the same as the second DID.

13. The NFCC of claim 12, wherein the processor is further configured to determine that the first length value is less than or equal to a second length value and less than or equal to a third length value before the communication interface sends the first request comprising the first length value to the second NFC device.

14. The NFCC of claim 13, wherein the communication interface is further configured to: send a second notification to the DH, wherein the second notification is used to notify the DH that a second RF interface has been activated; and receive, using the second RF interface, a second data message from the DH, wherein the processor is further configured to encapsulate a payload in the second data message into a second data packet using the first length value as the maximum length value, and wherein the communication interface is further configured to send the second data packet to the second NFC device.

15. The NFCC of claim 12, wherein the communication interface is further configured to receive, using the first RF interface, a first data message from the DH, wherein the processor is further configured to encapsulate a payload in the first data message into a first data packet using the first length value as the maximum length value, and wherein the communication interface is further configured to send the first data packet to the second NFC device.

16. The NFCC of claim 12, wherein the first request is a parameter selection request (PSL_REQ) defined in Digital specification, wherein the first response is a parameter selection response (PSL_RES) defined in the Digital specification, wherein the first RF interface is a NFC Data Exchange Protocol (NFC-DEP) radio frequency interface defined in a NFC controller interface (NCI) specification, and wherein the first notification is a radio frequency interface-activated notification (RFINTFACTIVATED NTF) defined in the NCI specification.

* * * * *

UNITED STATES PATENT AND TRADEMARK OFFICE
CERTIFICATE OF CORRECTION

PATENT NO. : 10,470,019 B2  
APPLICATION NO. : 15/576649  
DATED : November 5, 2019  
INVENTOR(S) : Xiaona Zhao and Xinmiao Chang Page 1 of 1

It is certified that error appears in the above-identified patent and that said Letters Patent is hereby corrected as shown below:

In the Claims

Claim 5, Column 51, Line 61: "(PSLREQ)" should read "(PSL_REQ)"

Claim 5, Column 51, Line 63: "(PSL RES)" should read "(PSL_RES)"

Claim 5, Column 52, Line 1: "(RF _INTFACTIVATED NTF)" should read "(RF_INTF_ACTIVATED_NTF)"

Claim 11, Column 53, Line 13: "(PSLRES)" should read "(PSL_RES)"

Claim 11, Column 53, Line 18: "(RFINTF ACTIVATED NTF)" should read "(RF_INTF_ACTIVATED_NTF)"

Claim 16, Column 54, Line 43: "(RFINTFACTIVATED NTF)" should read "(RF_INTF_ACTIVATED_NTF)"

Signed and Sealed this  
Tenth Day of December, 2019

Andrei Iancu  
*Director of the United States Patent and Trademark Office*